(12) United States Patent
Lazo et al.

(10) Patent No.: US 10,578,931 B2
(45) Date of Patent: Mar. 3, 2020

(54) LIQUID CRYSTAL DISPLAY DEVICE

(71) Applicant: Samsung Display Co. Ltd., Yongin-si (KR)

(72) Inventors: IsraelEsteban Lazo, Hwaseong-si (KR); Heung Shik Park, Seoul (KR); Ki Chul Shin, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/606,420

(22) Filed: May 26, 2017

(65) Prior Publication Data

US 2018/0101072 A1    Apr. 12, 2018

(30) Foreign Application Priority Data

Oct. 12, 2016    (KR) .................. 10-2016-0131783

(51) Int. Cl.
*G02F 1/1343* (2006.01)
*G02F 1/1337* (2006.01)
*G02F 1/1333* (2006.01)
*G02F 1/1362* (2006.01)
*G02F 1/1335* (2006.01)

(52) U.S. Cl.
CPC .. *G02F 1/134309* (2013.01); *G02F 1/133345* (2013.01); *G02F 1/133707* (2013.01); *G02F 1/136286* (2013.01); *G02F 1/133514* (2013.01); *G02F 2201/123* (2013.01)

(58) Field of Classification Search
None
See application file for complete search history.

(56) References Cited

U.S. PATENT DOCUMENTS

| 8,854,581 | B2 | 10/2014 | Masahiro et al. |
| 9,874,790 | B2* | 1/2018 | Zhong ............... G02F 1/134309 |
| 2001/0026341 | A1* | 10/2001 | Lee .................... G02F 1/133707 |
| | | | 349/123 |
| 2005/0088597 | A1* | 4/2005 | Maeda ................. G02F 1/1333 |
| | | | 349/139 |

(Continued)

FOREIGN PATENT DOCUMENTS

| JP | 5116879 | 1/2013 |
| KR | 1020050033023 | 4/2005 |

(Continued)

*Primary Examiner* — Ryan Crockett
(74) *Attorney, Agent, or Firm* — Cantor Colburn LLP

(57) ABSTRACT

A liquid-crystal display device includes: a substrate; and an insulation film disposed on the substrate and which includes a flat portion and a projection pattern unit protruding from the flat portion in a direction perpendicular to the flat portion; and a pixel electrode disposed on the substrate. The pixel electrode includes a first stem electrode and a second stem electrode extending along a first direction and disposed to be spaced apart from the first stem in a second direction perpendicular to the first direction, and a plurality of branch electrode extending from the first stem electrode and the second stem electrode, and the projection pattern unit includes a first projection pattern extending along the first direction and partially overlapping the first stem electrode, and a second projection pattern extending along the first direction and partially overlapping the second stem electrode.

19 Claims, 15 Drawing Sheets

(56) References Cited

U.S. PATENT DOCUMENTS

| | | | |
|---|---|---|---|
| 2011/0260957 A1* | 10/2011 | Jeong | G02F 1/133707 345/98 |
| 2012/0314154 A1* | 12/2012 | Zhang | G02F 1/1333 349/58 |
| 2014/0375918 A1 | 12/2014 | Yoshida et al. | |
| 2015/0002798 A1* | 1/2015 | Miyakawa | G02F 1/133707 349/123 |
| 2015/0049288 A1* | 2/2015 | Yeh | G02F 1/133707 349/138 |
| 2016/0018705 A1* | 1/2016 | Cheng | G02F 1/134309 349/123 |
| 2016/0370660 A1* | 12/2016 | Zhao | G02F 1/1333 |
| 2017/0052409 A1* | 2/2017 | Lee | G02F 1/133553 |
| 2017/0343860 A1* | 11/2017 | Park | G02F 1/133512 |
| 2018/0052344 A1* | 2/2018 | Suwa | G02F 1/1343 |

FOREIGN PATENT DOCUMENTS

| | | |
|---|---|---|
| KR | 20170132943 A | 12/2017 |
| WO | 2011024703 | 3/2011 |

\* cited by examiner

LIQUID CRYSTAL DISPLAY DEVICE

This application claims priority to Korean Patent Application No. 10-2016-0131783 filed on Oct. 12, 2016, and all the benefits accruing therefrom under 35 U.S.C. § 119, the content of which in its entirety is herein incorporated by reference.

BACKGROUND

1. Field

Embodiments of the invention relate to a liquid crystal display device.

2. Description of the Related Art

A liquid crystal display device, which is one of the most widely used types of flat panel display device, typically includes two substrates provided with field generating electrodes, such as a pixel electrode and a common electrode, and a liquid crystal layer disposed between the two substrates. The liquid crystal display device is configured in way such that a voltage is applied to the field generating electrodes to generate an electric field in the liquid crystal layer, and thus the direction of liquid crystal molecules in the liquid crystal layer is determined and the polarization of incident light is controlled, thereby displaying an image.

Among such liquid crystal display devices, a vertically aligned liquid crystal display device, in which the major axes of liquid crystal molecules are arranged in a direction perpendicular to upper and lower substrates, has been developed.

SUMMARY

A vertically aligned liquid crystal display device may have different lateral visibility from front visibility. Specifically, the liquid crystal display device may be viewed to be brighter when the liquid crystal display device is viewed from a lateral side compared to when viewed from the front side. In the vertically aligned liquid crystal display device, as the difference in brightness between the front side view and the lateral side view increases, visibility deteriorates.

Therefore, the vertically aligned liquid crystal display device is desired to have a structure capable of improving visibility by minimizing the difference in brightness between the front side view and the lateral side view.

Further, the vertically aligned liquid crystal display device is desired to have a structure capable of improving transmittance while minimizing the difference in brightness between the front side view and the lateral side view.

According to an exemplary embodiment of the disclosure, a liquid-crystal display device includes a substrate, an insulation film disposed on the substrate, where the insulation film includes a flat portion and a projection pattern unit protruding from the flat portion in a direction perpendicular to the flat portion, and a pixel electrode disposed on the substrate. In such an embodiment, the pixel electrode includes a first stem electrode, a second stem electrode extending along a first direction and disposed to be spaced apart from the first stem electrode in a second direction perpendicular to the first direction, and a plurality of branch electrode extending from the first stem electrode and the second stem electrode. In such an embodiment, the projection pattern unit includes a first projection pattern extending along the first direction and partially overlapping the first stem electrode, and a second projection pattern extending along the first direction and partially overlapping the second stem electrode.

According to another exemplary embodiment of the disclosure, a liquid-crystal display device includes a substrate, an insulation film disposed on the substrate, where the insulation film includes a flat portion and a projection pattern unit protruding from the flat portion in a direction perpendicular to the flat portion, and a pixel electrode disposed on the substrate, divided into four quadrants having a same shape as each other, where the four quadrants of the pixel electrode respectively define a first domain disposed at a right upper end in a plan view, a second domain disposed at a left upper end in a plan view, a third domain disposed at a left lower end in a plan view, and a fourth domain disposed at a right lower end in a plan view. In such an embodiment, the pixel electrode includes a first stem electrode disposed along left edges of the second domain and the third domain, a second stem electrode disposed along right edges of the first domain and the fourth domain, and a plurality of branch electrodes extending from the first stem electrode and the second stem electrode. In such an embodiment, the projection pattern unit includes a first projection pattern disposed along the left edges of the second domain and the third domain and partially overlapping the first stem electrode, and a second projection pattern disposed along the edges of the first domain and the fourth domain and partially overlapping the second stem electrode.

According to embodiments of the invention, a liquid crystal display device has improved visibility.

According to embodiments of the invention, a liquid crystal display device has improved transmittance.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
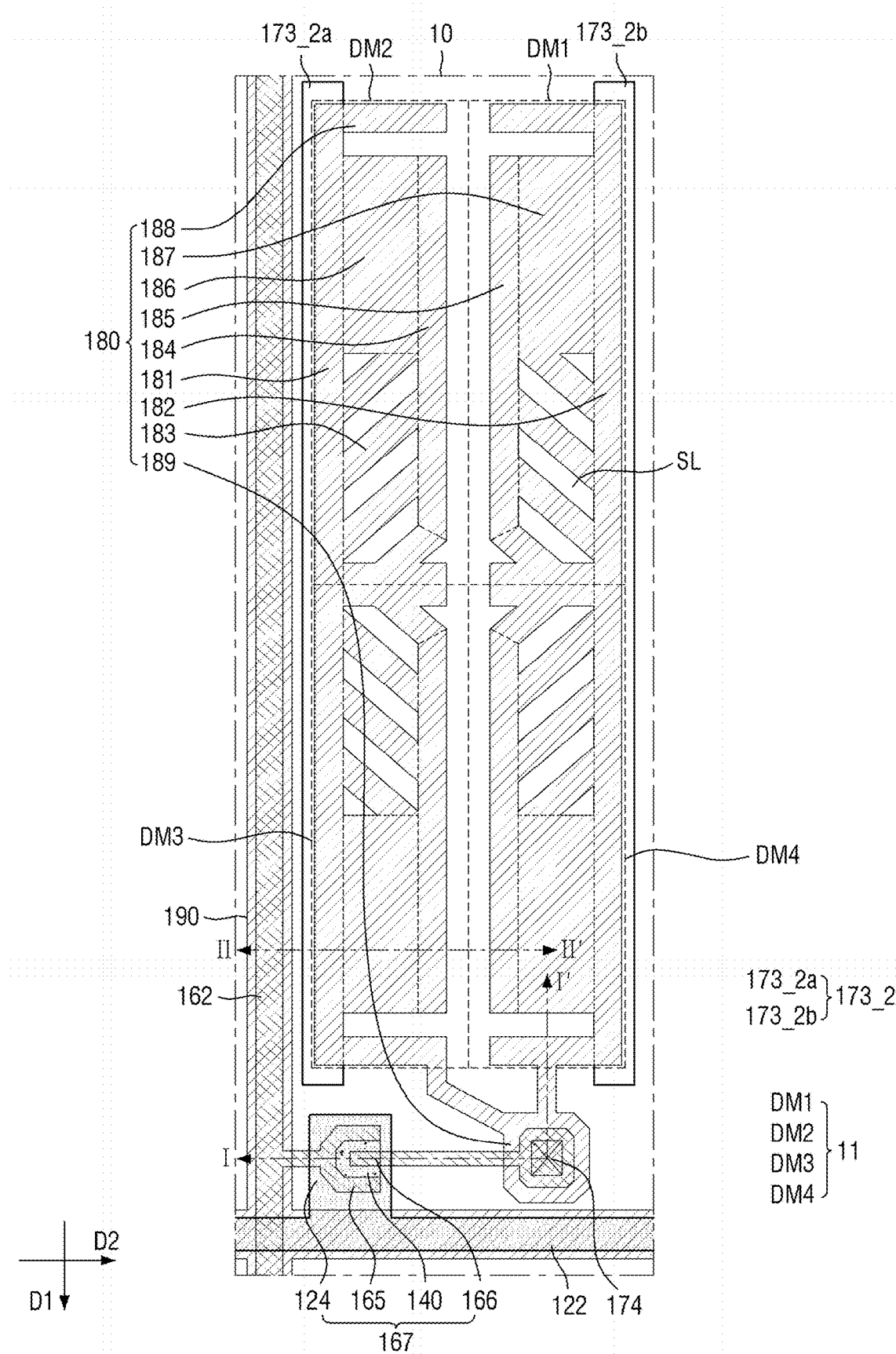
FIG. 1 is a plan view of a pixel of a liquid crystal display device according to an embodiment of the invention.

The invention will now be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Herein, an electronic apparatus may be any apparatus provided with a display device. Examples of the electronic apparatus may include smart phones, mobile phones, navigators, game machines, televisions ("TV"s), car head units, notebook computers, laptop computers, tablet computers, personal media players ("PMP"s), and personal digital assistants ("PDA"s). The electronic apparatus may be embodied as a pocket-sized portable communication terminal having a wireless communication function. Further, the display device may be a flexible display device capable of changing its shape.

Hereinafter, exemplary embodiments of the invention will be described in detail with reference to the attached drawings.

Figure 2:
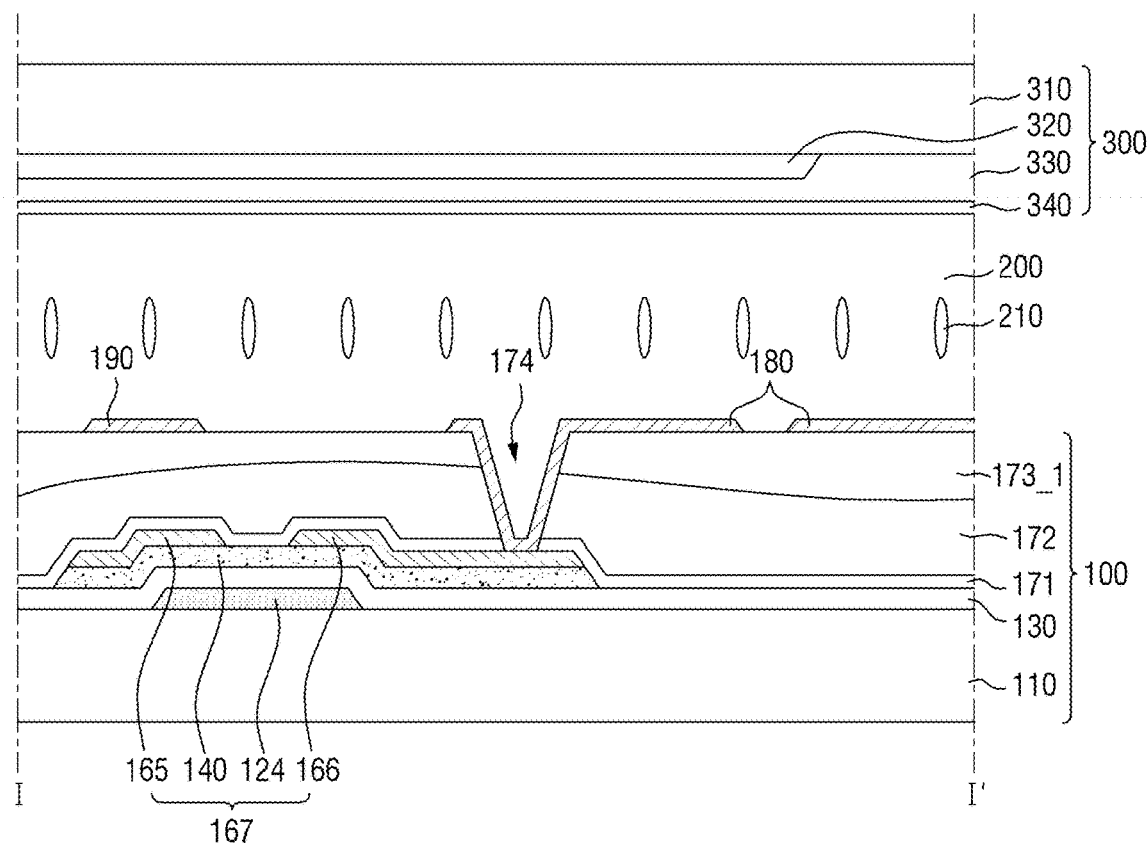
FIG. 2 is a cross-sectional view taken along line I-I' of FIG. 1.
Figure 3:
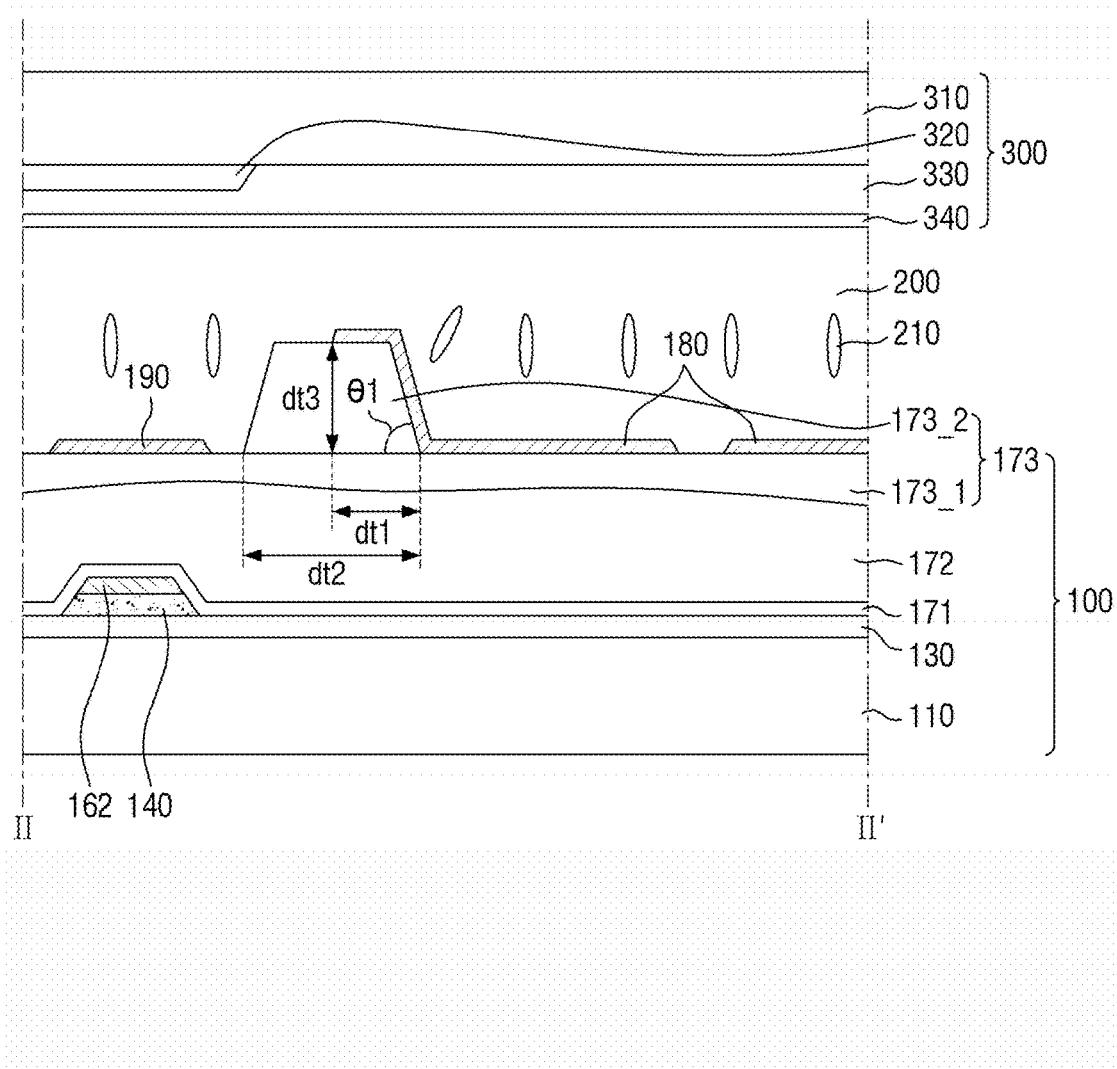
FIG. 3 is a cross-sectional view taken along line II-II' of FIG. 1.

FIG. 1 is a plan view of a pixel of a liquid crystal display device according to an embodiment of the invention, FIG. 2 is a cross-sectional view taken along line I-I' of FIG. 1, and FIG. 3 is a cross-sectional view taken along line II-II' of FIG. 1.

Referring to FIGS. 1 to 3, an embodiment of a liquid crystal display device includes a first display panel 100, a liquid crystal layer 200, and a second display panel 300.

The first display panel 100 includes a switching element for driving liquid crystal molecules 210, for example, a thin film transistor 167. The second display panel 300 is disposed to face the first display panel 100.

The liquid crystal layer 200 is disposed between the first display panel 100 and the second display panel 300, and the liquid crystal layer 200 may include a plurality of liquid crystal molecules 210 having dielectric anisotropy. When an electric field is applied between the first display panel 100 and the second display panel 300, the liquid crystal molecules 210 rotate in a predetermined direction between the first display panel 100 and the second display panel 300, thereby controlling light transmittance, e.g., blocking or transmitting light. Here, the term "rotation" means the change in arrangement of the liquid crystal molecules 210 as well as the actual rotation of the liquid crystal molecules 210.

The liquid crystal display device includes a plurality of pixels 10 arranged in the form of a matrix. Each of the pixels 10 may independently control a gray level, and may be a basic unit for expressing a specific color. Each of the pixels 10 includes an active area 11 in which light incident on the lower portion of the first display panel 100 is transmitted to the upper portion of the second display panel 300 to actually express a color.

Hereinafter, the first display panel 100 will be described.

The first display panel 100 includes a first base substrate 110. The first base substrate 110 may be a transparent insulation substrate. In one exemplary embodiment, for example, the first base substrate 110 may be a glass substrate, a quartz substrate, or a transparent resin substrate.

In an embodiment, the first base substrate 110 may be curved along one direction. In an alternative embodiment, the first base substrate 110 may have flexibility. In such an embodiment, the first base plate 110 may be deformed by rolling, folding, bending, or the like.

The first display panel 100 further includes a gate line 122 and a gate electrode 124 disposed on the first base substrate 110.

The gate line transmits a gate voltage for controlling the thin film transistor 167. The gate line 122 may have a shape extending in a second direction D2.

Here, the second direction D2, which is a direction perpendicular to a first direction D1, corresponds to a direction extending in parallel to one side of the first base substrate 110 on a plane in which the first base substrate 110 is disposed. The second direction D2, as shown in FIG. 1, may be defined as a direction indicated by any straight line extending from a right side to a left side when viewed from a plan view in a thickness direction of the first base substrate 110. The first direction D1, as shown in FIG. 1, may be defined as a direction indicated by any straight line extending from an upper side to a lower side when viewed from the plan view in the thickness direction of the first base substrate 110.

The gate voltage is externally supplied, and may have a variable voltage level. The on/off operation of the thin film transistor 167 may be controlled in response to the voltage level of the gate voltage.

The gate electrode 124 may have a shape protruding from the gate line 122, and may be physically connected with the gate line 122. The gate electrode 124 may be one component constituting the thin film transistor 167 which will be described later.

The gate line 122 and the gate electrode 124 may include or be made of the same material. In one embodiment, for example, each of the gate line 122 and the gate electrode 124 may include an aluminum-based metal, such as aluminum (Al) or an aluminum alloy, a silver-based metal, such as silver (Ag) or a silver alloy, a copper-based metal, such as copper (Cu), a copper alloy, a molybdenum-based metal, such as molybdenum (Mo) or a molybdenum alloy, chromium (Cr), tantalum (Ta), or titanium (Ti). Each of the gate line 122 and the gate electrode 124 may have a single-layer structure, or may have a multi-layer structure including at least two conductive films having different physical properties from each other.

A first insulation film 130 is disposed on the gate line 122 and the gate electrode 124. The first insulation film 130 may include or be made of an insulating material, for example, silicon nitride or silicon oxide. The first insulation film 130 may have a single-layer structure, or may have a multi-layer structure including at least two insulating films having different physical properties from each other.

A semiconductor layer 140 is disposed on the first insulation film 130. At least a part of the semiconductor layer 140 may overlap the gate electrode 124. The semiconductor layer 140 may include or be made of amorphous silicon, polycrystalline silicon, or oxide semiconductor.

The semiconductor layer 140 may overlap a data line 162, a source electrode 165 and a drain electrode 166, which will be described later.

Although not shown, in some embodiments, a resistive contact member may be additionally disposed on the semiconductor layer 140. The resistive contact member may include or be made of n+ hydrogenated amorphous silicon doped with n type impurities in a high concentration, or may include silicide. A pair of the resistive members may be disposed on the semiconductor layer 140. The resistive contact member may allow the source electrode 165, the drain electrode 166 and the semiconductor layer 140 to have ohmic contact characteristics among them. In an embodiment, where the semiconductor layer 140 includes an oxide semiconductor, the resistive contact member may be omitted.

The data line 162, the source electrode 165 and the drain electrode 166 are disposed on the semiconductor layer 140 and the first insulation film 130.

The data line 162 may extend in the first direction D1 to intersect the gate line 122.

The data line 162 may be insulated from the gate line 122 and the gate electrode 124 by the first insulation film 130.

The data line 162 may provide a data voltage to the source electrode 165. Here, the data voltage is externally provided, and may have various voltage levels. The gray level of each pixel 10 may be controlled in response to the voltage level of the data voltage.

The source electrode 165 is branched from the data line 162, and at least a part of the source electrode 165 may overlap the gate electrode 124.

The drain electrode 166, as shown in FIG. 1, may be disposed to be spaced apart from the source electrode 165 with the semiconductor layer 140 disposed therebetween, and at least a part of the drain electrode 166 may overlap the gate electrode 124.

As shown in FIG. 1, the source electrode 165 may have a C-like shape surrounding the drain electrode 166 at a predetermined interval. However, the invention is not limited thereto, and the source electrode 165 may have a bar shape to be spaced apart from the drain electrode 166 in parallel at a predetermined interval.

The data line 162, the source electrode 165 and the drain electrode 166 may include or be made of a same material as each other. In one exemplary embodiment, for example, each of the data line 162, the source electrode 165 and the drain electrode 166 may include or be made of aluminum, copper, silver, molybdenum, chromium, titanium, tantalum, or an alloy thereof. In an embodiment, each of the data line 162, the source electrode 165 and the drain electrode 166 may have a multi-layer structure including a lower film (not shown) including a refractory metal and an upper film (not shown) having low resistance, but the invention is not limited thereto.

The gate electrode 124, the semiconductor layer 140, the source electrode 165, and the drain electrode 166 may constitute a thin film transistor 167, which is a switching element.

A passivation film 171 is disposed on the first insulation 130 and the thin film transistor 167. The passivation film 171 may include or be made of an inorganic insulating material, and may be disposed to cover the thin film transistor 167. The passivation film may protect the thin film transistor 167, and may effectively prevent a material in a color filter layer 172 and a second insulation film 173, which will be described later, from flowing into the semiconductor layer 140.

A color filter layer 172 is disposed on the passivation film 171. The color filter layer 172 may include or be made of a photosensitive organic composition containing a pigment for expressing a color. The composition may include any one of red, green and blue pigments. In one exemplary embodiment, for example, the color filter layer 172 may include a plurality of color filters. In one exemplary embodiment, for example, any one of the plurality of color filters expresses any one of three primary colors of red, green and blue colors. However, the invention is not limited thereto, and the plurality of color filters may express any one of cyan, magenta, yellow and white colors.

A second insulation film 173 is disposed on the color filter 172. The second insulation film 173 may include or be made of an insulating material, and may be an organic film including an organic material.

The second insulation film 173 includes a flat portion 173_1 and a projection pattern unit 173_2.

The flat portion 173_1 may flatten the height level difference caused by the components between the flat portion 173_1 and the first base substrate 110. In such an embodiment, the upper surface of the flat portion 173_1 may be substantially flat.

The projection pattern portion 173_2 may protrude from the flat portion 173_1 in a direction perpendicular to the first base substrate 110. In such an embodiment, the section of the projection pattern portion 173_2 has a parallelogram shape, but may have other shapes without limitation. In an alternative embodiment, the section of the projection pattern portion 173_2 may a semicircle shape convexly protruding from the flat portion 173_1 in a direction perpendicular to the first base substrate 110.

A part of the projection pattern portion 173_2 may overlap a pixel electrode 180 to be described later. In such an embodiment, a part of the pixel electrode 180 is disposed on the projection pattern portion 173_2 having a level difference protruding from the flat portion 173_1, and thus the pixel electrode 180 may also have a level difference.

In an embodiment, the projection pattern portion 173_2 disposed in each pixel 10 includes a first projection pattern 173_2a and a second projection pattern 173_2b. The first projection pattern 173_2a and the second projection pattern 173_2b may extend along the first direction D1, and may be disposed to be spaced apart from each other in parallel. A part of the first projection pattern 173_2a may overlap a first stem electrode 181 to be described later, and a part of the second projection pattern 173_2b may overlap a second stem electrode 182 to be described later.

The width dt2 of the first projection pattern 173_2a and the second projection pattern 173_2b, that is, the width dt2 of the first projection pattern 173_2a and the second projection pattern 173_2b measured in the second direction D2, may be in a range from about 4 micromeres (μm) to about 6 μm. The height of the first projection pattern 173_2a and the second projection pattern 173_2b protruding in a direction perpendicular to the first base substrate 110 may be in a range from about 1 μm to about 2 μm. The first angle θ1 between the first base substrate 110 and the lateral side of the first projection pattern 173_2a and the second projection pattern 173_2b may be in a range from about 40° to about 80°. The first projection pattern 173_2a and the second projection pattern 173_2b may have such a shape, and may obtain effects of improving visibility and transmittance when the first projection pattern 173_2a and the second projection pattern 173_2b overlap a part of a pixel electrode 180 to be described later. A detailed description thereof and a specific structure of the projection pattern portion 173_2 and the pixel electrode 180 overlapping each other will be described later in greater detail.

A contact hole 174 exposing a part of the thin film transistor 167, e.g., a part of the drain electrode 166 along a direction perpendicular to the upper surface of the first base substrate 110 may be defined or formed in the passivation film 171, the color filter layer 172 and the second insulation film 173. The contact hole 174 may have a shape penetrating the passivation film 171, the color filter layer 172 and the second insulation film 173 along a direction perpendicular to the upper surface of the first base substrate 110. A pixel electrode 180 disposed on a part of the drain electrode and the second insulation film 173 may be physically connected with each other through the contact hole 174.

A pixel electrode 180 and a blocking electrode 190 may be disposed on the second insulation film 173. The pixel electrode 180 and the blocking electrode 190 may be disposed in a same plane not to overlap each other.

The pixel electrode 180 may be physically connected with the drain electrode 166 through the contact hole 174, and may receive the data voltage from the drain electrode 166.

The pixel electrode 180 may include or be made of a transparent conductive material, such as indium tin oxide ("ITO"), indium zinc oxide ("IZO"), indium tin zinc oxide ("ITZO"), or aluminum (Al)-doped zinc oxide ("AZO").

The pixel electrode 180 may be generally disposed in an active area 11, but may include an area extending to overlap the contact hole 174 (illustratively, an extension electrode 189 to be described later) to be connected with the drain electrode 166.

An area in which the pixel electrode 180 is disposed may be divided into a plurality of regions. In one exemplary embodiment, for example, the area in which the pixel electrode is disposed may be divided into four regions. In such an embodiment, the active area 11 may be divided into four regions. The four regions may respectively correspond to the four quartered regions of the active area 11. Among the four regions corresponding to the four quartered regions of the active area 11, the region disposed at right upper end may be defined as a first domain DM1, the region disposed at left upper end may be defined as a second domain DM2, the region disposed at left lower end may be defined as a third domain DM3, and the region disposed at right lower end may be defined as a fourth domain DM4, as shown in FIG. 1.

The first domain DM1, the second domain DM2, the third domain DM2, and the fourth domain DM3 may have a same sizer (or area) and a same shape as each other.

The pixel electrode 180 may have a shape which is line-symmetric with respect to a boundary line defining the first domain DM1 and the second domain DM2 or a boundary line defining the third domain DM3 and the fourth domain DM4. In an embodiment, the pixel electrode 180 may have a shape which is line-symmetric with respect to a boundary line defining the second domain DM2 and the third domain DM3 or a boundary line defining the first domain DM1 and the fourth domain DM4.

In an embodiment, slits SL which are openings containing no transparent conductive material may be defined in the pixel electrode 180. The pixel electrode 180 may have a patterned shape defined based on the slits SLs, and the direction and degree of the liquid crystal molecules 210 disposed to overlap the pixel electrode 180 may be controlled depending on the shape and pattern of the pixel electrode 180.

The pixel electrode 180 includes a first stem electrode 181, a second stem electrode 182, a branch electrode 183, a first connection electrode 184, a second connection electrode 185, a first cover electrode 186, a second cover electrode 187, and an edge electrode 188.

The respective components constituting the pixel electrode 180 may be disposed in the active area 11. However, as described above, alternatively, the extension electrode 189 may be disposed outside the active area 11.

The first stem electrode 181 may extend along the first direction D1, and may be disposed along the edge of the active area 11. In such an embodiment, the second stem electrode 182 may extend along the first direction D1, and may be disposed along the edge of the opposite active area 11 in which the first stem electrode 181 is disposed. In such an embodiment, the first stem electrode 181 and the second stem electrode 182 may extend to be spaced apart from each other along the first direction D1. In such an embodiment, the first stem electrode 181, as shown in FIG. 1, may extend along the left edges of the second domain DM2 and the third domain DM3. In such an embodiment, the second stem electrode 182, as shown in FIG. 1, may extend along the right edges of the first domain DM1 and the fourth domain DM4.

In such an embodiment, the first stem electrode 181 may be disposed to overlap a part of the first projection pattern 173_2a, and the second stem electrode 182 may be disposed to overlap a part of the second projection pattern 173_2b. Thus, the first stem electrode 181 may have a level difference corresponding to the level difference of the first projection pattern 173_2a, and the second stem electrode 182 may have a level difference corresponding to the level difference of the second projection pattern 173_2b.

In an embodiment, both the first stem electrode 181 and the first projection pattern 173_2a may extend along the first direction D1. However, the first stem electrode 181 may not be disposed to overlap the entire region in which the first projection pattern 173_2a is disposed, but be disposed to overlap only a part of the first projection pattern 173_2a. In such an embodiment, as shown in FIG. 1, the first stem electrode 181 may be disposed to overlap a part of the right side of the first projection pattern 173_2a. Here, the width dt1 of a region in which the first stem electrode 181 overlaps the first projection pattern 173_2a, the width being measured in the second direction D2, may be in a range of about 1.5 μm to about 3 μm. In one exemplary embodiment, for example, the width dt1 of a region in which the first stem electrode 181 overlaps the first projection pattern 173_2a, the width being measured in the second direction D2, may be in a range of about 2.0 μm to about 2.5 μm.

In such an embodiment, both the second stem electrode 181 and the second projection pattern 173_2b may extend along the first direction D1. However, the second stem electrode 182 may not be disposed to overlap the entire region in which the second projection pattern 173_2b is disposed, but be disposed to overlap only a part of the second projection pattern 173_2b. In an embodiment, as shown in FIG. 1, the second stem electrode 182 may be disposed to overlap a part of the right side of the second projection pattern 173_2b. Here, the width dt1 of a region in which the second stem electrode 182 overlaps the second projection pattern 173_2b, the width being measured in the second direction D2, may be in a range of about 1.5 μm to about 3 μm. In one embodiment, for example, the width dt1 of a region in which the second stem electrode 182 overlaps the second projection pattern 173_2b, the width being measured in the second direction D2, may be in a range of about 2.0 μm to about 2.5 μm.

The visibility and transmittance of the liquid crystal display device may be improved by the overlapping of the first stem electrode 181 and the first projection pattern 173_2a and the overlapping of the second stem electrode 182 and the second projection pattern 173_2b.

In an embodiment, in the region in which the first stem electrode 181 overlaps the first projection pattern 173_2a, the distance between the first stem electrode 181 and a common electrode 340 to be described later decreases, and thus the intensity of an electrical field generated in the liquid crystal layer 200 may be stronger.

In such an embodiment, the first electrode 181 has the level difference due to the first projection pattern 173_2a, and thus the liquid crystal molecules 210 disposed along the region in which the first stem electrode 181 and the first projection pattern 173_2a may be more easily controlled such that they are inclined toward the right side in FIG. 1. In such an embodiment, the second electrode 182 has the level difference due to the second projection pattern 173_2b, and thus the liquid crystal molecules 210 disposed along the region in which the second stem electrode 182 and the second projection pattern 173_2b may be more easily controlled such that they are inclined toward the left side in FIG. 1.

Accordingly, in such an embodiment, the visibility and transmittance of the liquid crystal display device may be improved.

Table 1 below is referred to the more detailed description related to the values of the widths of the aforementioned overlap regions.

TABLE 1

| Widths (μm) of regions in which first and second projection patterns respectively overlap first and second stem electrodes | 1.5 | 2.0 | 2.5 | 3.0 |
|---|---|---|---|---|
| Transmittance (%) | 115.8 | 119 | 116.2 | 113.7 |
| Visibility values | 0.343 | 0.333 | 0.313 | 0.318 |

Table 1 above shows the values of transmittance and visibility of each pixel 10, the values being measured according to the width dt1 of the region in which the first projection pattern 173_2a and the first stem electrode 181 and the width of the region in which the second projection pattern 173_2b and the second stem electrode 182. Here, the unit of the width dt1 of the region in which the first projection pattern 173_2a and the first stem electrode 181 and the unit the width of the region in which the second projection pattern 173_2b and the second stem electrode 182 are "μm", the unit of transmittance is "%", and the unit of the value of visibility may be dimensionless. It may be understood that transmittance is good as the value thereof becomes higher, and it may be understood that visibility is improved as the value thereof becomes lower.

Referring to Table 1, it may be understood that transmittance is best when each of the widths of the regions in which the first and second projection patterns 173_2a and 173_2b respectively overlap the first and second stem electrodes 181 and 182 is about 2.0 μm. Further, it may be understood that visibility is best when each of the widths of the regions in which the first and second projection patterns 173_2a and 173_2b respectively overlap the first and second stem electrodes 181 and 182 is about 2.5 μm.

In contrast, it may be understood that, when each of the widths of the regions in which the first and second projection patterns 173_2a and 173_2b respectively overlap the first and second stem electrodes 181 and 182 is about 1.5 μm, both transmittance and visibility become poorer, compared to when each of the widths of the regions in which the first and second projection patterns 173_2a and 173_2b respectively overlap the first and second stem electrodes 181 and 182 is about 2.0 μm. Similarly, it may be understood that, when each of the widths of the regions in which the first and second projection patterns 173_2a and 173_2b respectively overlap the first and second stem electrodes 181 and 182 is about 3.0 μm, both transmittance and visibility become poorer, compared to when each of the widths of the regions in which the first and second projection patterns 173_2a and 173_2b respectively overlap the first and second stem electrodes 181 and 182 is about 2.5 μm. Therefore, the optimal value of each of the widths of the regions in which the first and second projection patterns 173_2a and 173_2b respectively overlap the first and second stem electrodes 181 and 182 may be set to in a range of about 2.0 µm to about 2.5 µm.

The plurality of branch electrodes 183 may respectively extend from the first stem electrode 181 and the second stem electrode 182 in a direction oblique to the first direction D1, that is, in an oblique direction which is not parallel to the first direction D1. However, the respective branch electrodes 183 may extend from the first domain DM1, the second domain DM2, the third domain DM3 and the fourth domain DM4 in different directions from each other. In an embodiment, the branch electrodes 183 disposed in the second domain DM2 and the third domain DM3 may extend from the first stem electrode 181. In such an embodiment, the branch electrodes 183 disposed in the first domain DM1 and the fourth domain DM4 may extend from the second stem electrode 182. In such an embodiment, the branch electrode 183 disposed in the first domain DM1 may extend toward the left upper end, the branch electrode 183 disposed in the second domain DM2 may extend toward the right upper end, the branch electrode 183 disposed in the third domain DM3 may extend toward the right lower end, and the branch electrode 183 disposed in the fourth domain DM4 may extend toward the left lower end. It is shown in FIG. 1 that each of the branch electrodes 183 extends to form an angle of about 45° between each of the branch electrodes 183 and the first branch electrode 181 or the second branch electrode 182. However, this is merely exemplary, and various angles may be formed therebetween without limitation.

In an embodiment, the branch electrode 183 disposed at the center of the first stem electrode 181, that is, the branch electrode 183 disposed at the boundary between the second domain DM2 and the third domain DM3 and extending from the first stem electrode 181, may extend toward the right side in parallel to the second direction D2. However, such a branch electrode may be omitted. Similarly, the branch electrode 183 disposed at the center of the second stem electrode 182, that is, the branch electrode 183 disposed at the boundary between the first domain DM1 and the fourth domain DM4 and extending from the second stem electrode 182, may extend toward the left side in parallel to the second direction D2. However, such a branch electrode may be omitted.

The liquid crystal molecules 210 may tend to be inclined toward the center of the active area 11 from the upper and lower ends of the active area 11 along the extending direction of the aforementioned branch electrodes, and the liquid crystal molecules 210 disposed at the center of the active area 11 may tend to be inclined toward the left side or the right side in FIG. 1, respectively.

The first connection electrode 184 and the second connection electrode 185 may connect the ends of some of the branch electrodes 183 with each other and may extend in parallel to the first direction D1. In an embodiment, the first connection electrode 184 may connect the ends of the branch electrodes 183 extending from the first branch electrode 181 with each other and may extend along the first direction D1. The second connection electrode 185 may connect the ends of the branch electrodes 183 extending from the second branch electrode 182 with each other and may extend along the second direction D2. In such an embodiment, the first connection electrode 184 may extend along the first direction D1 over the second domain DM2 and the third domain DM3, and may connect the ends of the branch electrodes 183 disposed in the second domain DM2 and the third domain DM3 with each other. The second connection electrode 185 may extend along the first direction D1 over the first domain DM1 and the fourth domain DM4, and may connect the ends of the branch electrodes 183 disposed in the first direction D1 over the first domain DM1 and the fourth domain DM4 with each other.

In an embodiment, where the first connection electrode 184 and second connection electrode 185 have the configurations described above, the control force of the pixel electrode 180 to the liquid crystal molecules 210 disposed along the boundary between the first domain DM1 and the second domain DM2 and the boundary between the third domain DM3 and the fourth domain DM4 increases, such that visibility and transmittance may be improved.

The first cover electrode 186 may be connected with the first stem electrode 181 and the first connection electrode 184, and may be disposed to overlap without an opening for exposing a part of the region between the first stem electrode 181 and the first connection electrode 184 to the upper side of the second insulation film 173. The second cover electrode 187 may be connected with the second stem electrode 182 and the second connection electrode 185, and may be disposed to overlap without an opening for exposing a part of the region between the second stem electrode 182 and the second connection electrode 185 to the upper side of the second insulation film 173. In such an embodiment, the first cover electrode 186 and the second cover electrode 187 may have the shape of a plate without a separate opened pattern.

In an embodiment, the pixel electrode 180 may include the plurality of first cover electrodes 186, and may include the plurality of second cover electrodes 187. In one embodiment, for example, one first cover electrode 186 may be disposed in each of the second domain DM2 and the third domain DM3, and one second cover electrode 187 may be disposed in each of the first domain DM1 and the fourth domain DM4. In an embodiment, as shown in FIG. 1, the first cover electrodes 186 may be disposed at the upper side of the second domain DM2 and the lower side of the third domain DM3, and the branch electrode 183 may be disposed between the two first cover electrodes 186. In such an embodiment, as shown in FIG. 1, the second cover electrodes 187 may be disposed at the upper side of the first domain DM1 and the lower side of the fourth domain DM4, and the branch electrode 183 may be disposed between the two second cover electrodes 187.

In an embodiment, the first cover electrode 186 and second cover electrode 187 have the shape of a plate, and thus a strong electric field is generated in the region in which the first cover electrode 186 and the second cover electrode 187 are disposed, to obtain the effect of improving transmittance.

The edge electrode 188 may extend from the end of each of the first stem electrode 181 and the second stem electrode 182 along the second direction D2. As shown in FIG. 1, the edge electrode 188 may be disposed along the upper edge of the first domain DM1, the upper edge of the second domain DM2, the lower edge of the third domain DM3, and the lower edge of the fourth domain DM4.

In such an embodiment, the control force of the pixel electrode 180 to the liquid crystal molecules 210 disposed adjacent to the upper and lower sides of the active area 11 increases by the edge electrode 188 disposed as shown in FIG. 1, such that visibility and transmittance may be improved.

The extension electrode 189 may extend to the outside of the active area 11, may overlap the contact hole 174, and may be disposed on the side wall of the contact hole 174, as shown in FIG. 2. Thus, the extension electrode 189 may be connected with the drain electrode 166 disposed under the passivation film 171, the color filter layer 172 and the second insulation film 173 to receive a predetermined voltage from the drain electrode 166. In such an embodiment, the extension electrode 189 extends from the edge electrode 188 to the outside of the active area 11 as shown in FIG. 1, but the invention may not be limited thereto. Alternatively, the extension electrode 189 may extend from the first branch electrode 181 and the second branch electrode 182, or may extend from other components constituting the pixel electrode 180.

In an alternative embodiment, the pixel electrode 180 in the active area 11 may be divided into two. In such an embodiment, the pixel electrode 180 in the active area 11 may be divided into the first stem electrode 181 and components connected therewith and the second stem electrode 182 and components connected therewith. However, both the first stem electrode 181 and components connected therewith and the second stem electrode 182 and components connected therewith may receive the same voltage from the drain electrode 166 through the contact hole 174, and may have the same voltage level as each other.

The blocking electrode 190 disposed in a same layer, e.g., directly on the flat portion 173_1, as the pixel electrode 180. The blocking electrode 190 may be disposed to be spaced apart from the pixel electrode 180 by a predetermined distance not to come into contact with the pixel electrode 180 or overlap the pixel electrode 180, and may not be physically and electrically connected with the pixel electrode 180. Thus, the data voltage supplied to the pixel electrode 180 may not be supplied to the blocking electrode 190.

The blocking electrode 190 may include or be made of a transparent conductive material, such as ITO, IZO, ITZO, or AZO, and may include or be made of a same material as the pixel electrode 180.

The blocking electrode 190 may be disposed to overlap the residual region excluding a region in which a part of the pixel electrode 180 is disposed, in the area other than the active area 11. However, the blocking electrode 190 may not always overlap the entire residual region excluding a region in which a part of the pixel electrode 180 is disposed, and may overlap a part of the residual region.

In an embodiment, the blocking electrode 190 may be disposed to overlap the data line 162. The data voltage is supplied to the data line 162, to effectively prevent the liquid crystal molecules 210 disposed to overlap the data line 162 from being influenced by the change in voltage level of the data voltage, thereby preventing light leakage.

In an embodiment, a first alignment film (not shown) may be additionally disposed on the pixel electrode 180 and the blocking electrode 190. The first alignment film may control the initial alignment angle of the liquid crystal molecules 210 injected into the liquid crystal layer 200.

Hereinafter, the second display panel 300 will be described.

The second display panel 300 includes a second base substrate 310, a light blocking member 320, an overcoat layer 330, and a common electrode 340.

The second base substrate 310 is disposed to face the first base substrate 110. The second base substrate 310 may have high durability capable of enduring external impact. The second base substrate 310 may be a transparent insulating substrate. In one exemplary embodiment, for example, the second base substrate 310 may be a glass substrate, a quartz substrate, or a transparent resin substrate. The second base substrate 310 may flat, but may also be curved in a predetermined direction.

The light blocking member 320 is disposed on one side of the second base substrate 310 facing the first display panel 100. The light-blocking member may be disposed to overlap the gate line 122, the data line 162, the thin film transistor 167 and the contact hole 174, that is, to overlap an area other than the active area 11, and may block the transmission of light in an area other than the active area 11. However, the invention is not limited thereto, and, in some embodiments, the light blocking member 320 may be disposed in the residual region excluding a part of the data line 162 disposed adjacent to the pixel electrode 180 in an area other than the active area 11. In such an embodiment, a part of the data line 162 overlapped by the light blocking member 320 may be overlapped by the blocking electrode 190, and thus the transmission of light may be blocked.

The overcoat layer 330 is disposed on one side of the light blocking member 320 facing the first display panel 100. The overcoat layer 330 may reduce the level difference caused by the light blocking member 320. In some embodiments, the overcoat layer 330 may be omitted.

The common electrode 340 is disposed on one side of the overcoat layer 330 facing the first display panel 100.

The common electrode 340 may include or be made of a transparent conductive material, such as ITO, IZO, ITZO, or AZO, for example.

The common electrode 340 may be disposed over the entire surface of the second base substrate 310 in the form of stave. An external common voltage is applied to the common electrode 340, to generate an electric field in the liquid crystal layer 200 together with the pixel electrode 180.

Here, the common voltage may be externally supplied, and the voltage level of the common voltage may be maintained constant during the operation of the liquid crystal display device. Thus, in the space between the pixel electrode 180 and the common electrode 340 which are disposed to overlap each other, an electric field may be generated by the difference in voltage level between the data voltage supplied to the pixel electrode 180 and the common electrode 340 and the common voltage. The liquid crystal molecules 210 may be rotated or inclined by the electric field.

In some embodiments, a voltage of the substantially same level as the common voltage may be supplied to the blocking electrode 190. Thus, during the operation of the liquid crystal display device, an electric filed having an orientation may not be formed in a part of the liquid crystal layer 200 disposed between the blocking electrode 190 and the common electrode 340 which are disposed to overlap each other. In such an embodiment, a potential difference is not generated because signals having the same voltage values are supplied to the blocking electrode 190 and the common electrode 340 such that the electric filed may not be formed between the blocking electrode 190 and the common electrode 340. Therefore, the liquid crystal molecules 210 disposed in the space between the blocking electrode 190 and the common electrode 340, which are disposed to overlap each other, may not be rotated or inclined, and may be maintained in the same state as the state in which the power of the liquid crystal display device is off. In such an embodiment, the liquid crystal molecules 210 may block the transmission of light when the power of the liquid crystal display device is off.

In an embodiment, a second alignment film (not shown) may be disposed on one side of the common electrode 340 facing the first display panel 100. The second alignment film, similarly to the first alignment film, may control the initial alignment angle of the liquid crystal molecules 210 injected into the liquid crystal layer 200.

Hereinafter, the liquid crystal layer 200 will be described.

The liquid crystal layer 200 includes a plurality of liquid crystal molecules having dielectric anisotropy and refractive anisotropy. The liquid crystal molecules 210 may be arranged in a direction perpendicular to the first display panel 100 and the second display panel 300 in a state in which an electric field is not generated in the liquid crystal layer 200. When an electric field is generated between the first display panel 100 and the second display panel 300, the liquid crystal molecules are rotated or inclined in a predetermined direction between the first display panel 100 and the second display panel 300, thereby changing the polarization of light.

Hereinafter, effects of improving the visibility and transmittance of the structure of the second insulation film 173 and the pixel electrode 180 according to an embodiment of the invention will be described.

Figure 4:
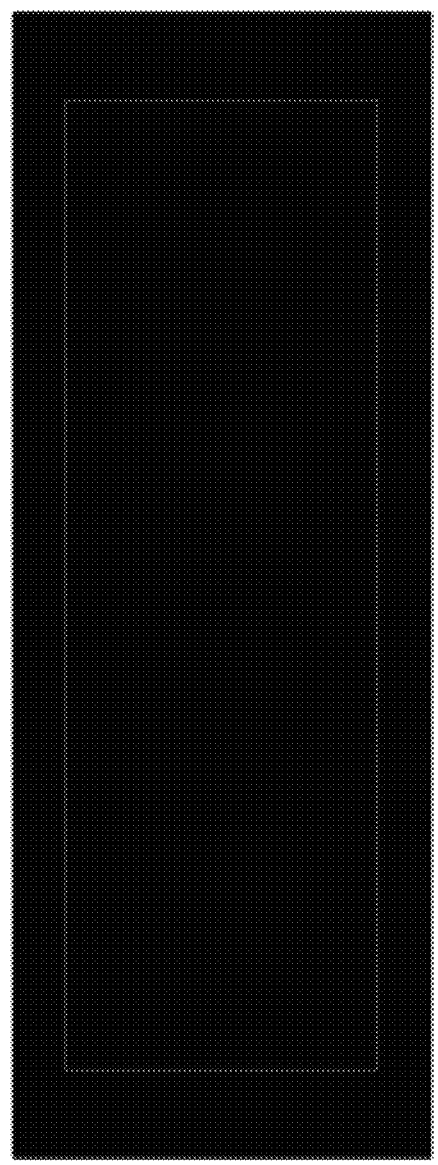
FIG. 4 is a photograph of an active area when a data voltage is not applied to a pixel electrode of FIG. 1.
Figure 5:
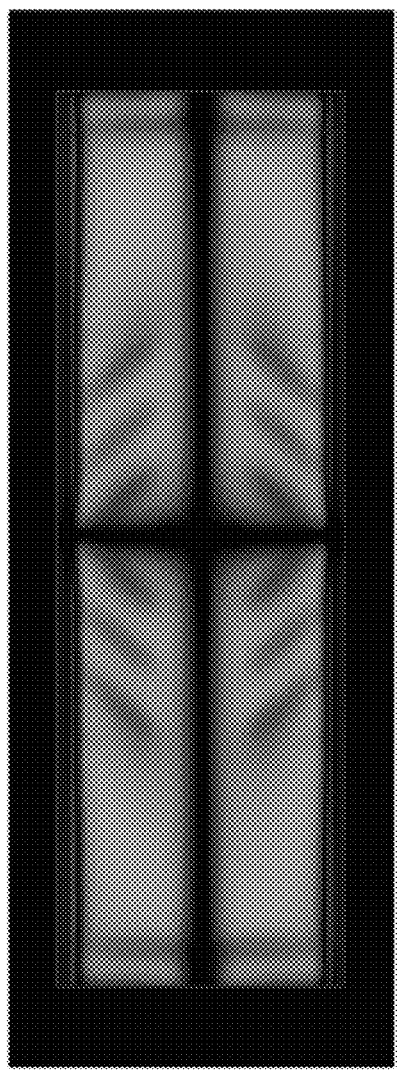
FIG. 5 is a photograph of an active area when a data voltage corresponding to a low gray level is applied to the pixel electrode of FIG. 1.
Figure 6:
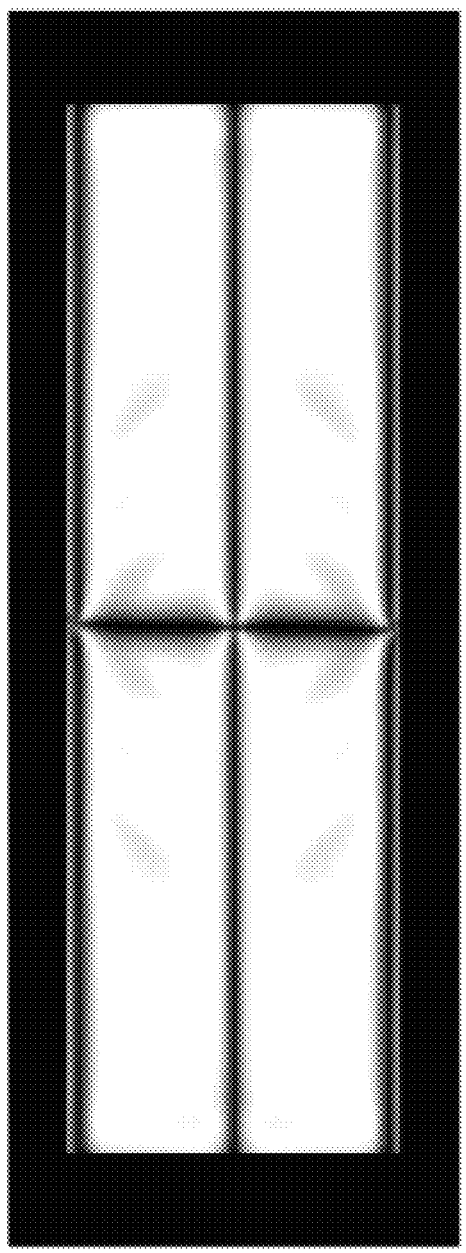
FIG. 6 is a photograph of an active area when a data voltage corresponding to a high gray level is applied to the pixel electrode of FIG. 1.

FIG. 4 is a photograph of an active area when a data voltage is not applied to a pixel electrode of FIG. 1, FIG. 5 is a photograph of an active area when a data voltage corresponding to a low gray level is applied to the pixel electrode of FIG. 1, and FIG. 6 is a photograph of an active area when a data voltage corresponding to a high gray level is applied to the pixel electrode of FIG. 1.

FIGS. 4, 5, and 6 correspond to photographs of observing the active area 11. In FIG. 4, the difference in voltage level provided to the pixel electrode 180 and the common electrode 340 may be the smallest, and in FIG. 6, the difference in voltage level provided to the pixel electrode 180 and the common electrode 340 may be the largest. Illustratively, it is assumed in FIG. 4 that the difference in voltage between the pixel electrode 180 and the common electrode 340 is about zero (0) volt (V), it is assumed in FIG. 5 that the difference in voltage between the pixel electrode 180 and the common electrode 340 is about 3.4 V, and it is assumed in FIG. 6 that the difference in voltage between the pixel electrode 180 and the common electrode 340 is about 8 V.

First, referring to FIG. 4, when the data voltage is not separately applied to the pixel electrode 180, the active area 11 may appear black.

Next, referring to FIG. 5, when the data voltage having a voltage value corresponding to a low gray level is applied to the pixel electrode 180, in the active area 11, a region in which the first stem electrode 181, the second stem electrode 182, the branch electrode 183, the first connection electrode 184, the second connection electrode 185, the first cover electrode 186, the second cover electrode 187 and the edge electrode 188 are disposed may appear bright.

Next, referring to FIG. 6, when the data voltage having a voltage value corresponding to a high gray level is applied to the pixel electrode 180, most of the active area 11 may appear bright.

Finally, referring to FIGS. 4 to 6, when the data voltage is not applied or is a low gray level, it may be understood that the region having appeared relatively dark appears bright at a high gray level, and that the transmittance characteristics at a high gray level are good.

Figure 7:
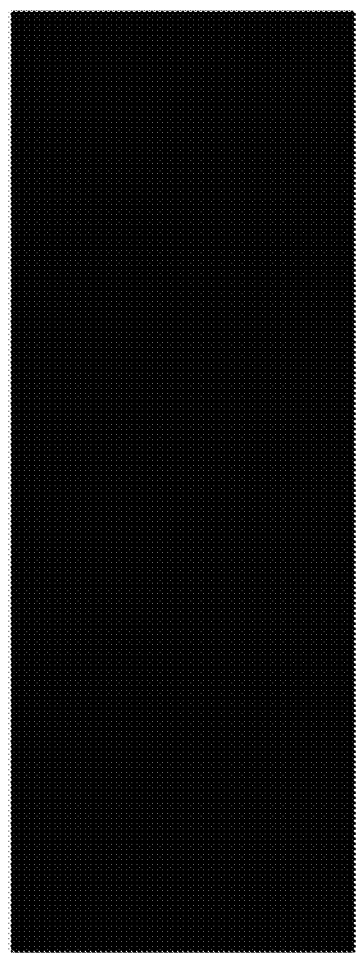
FIG. 7 is a photograph of an active area when a data voltage is not applied to a pixel electrode of a liquid crystal display device according to a comparative embodiment.
Figure 8:
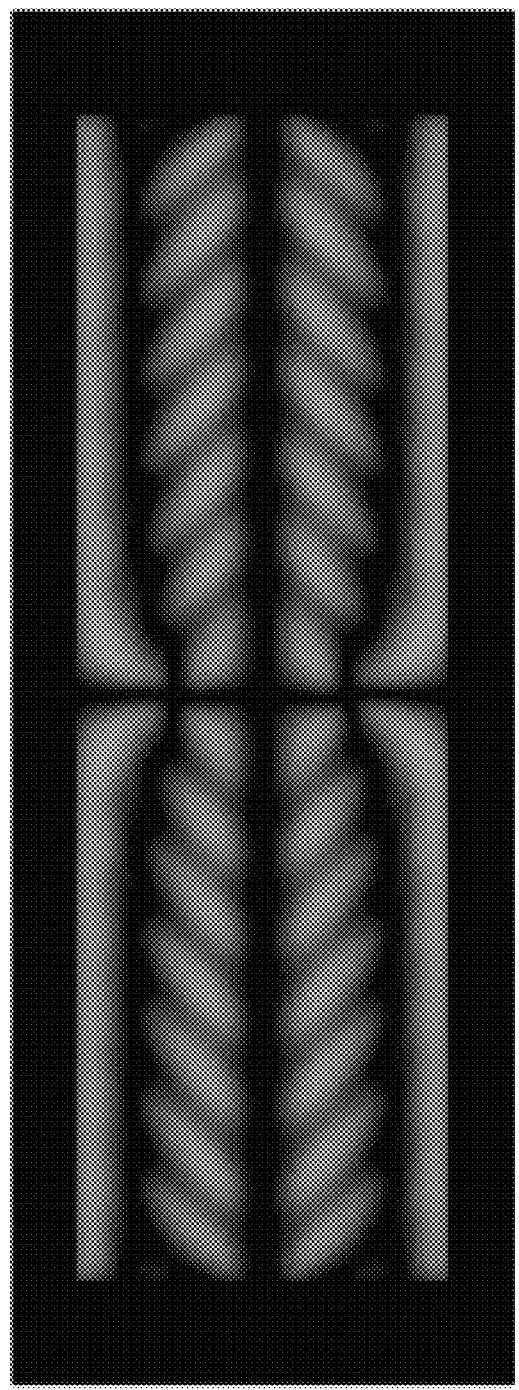
FIG. 8 is a photograph of an active area when a data voltage corresponding to a low gray level is applied to the pixel electrode of the liquid crystal display device according to a comparative embodiment.
Figure 9:
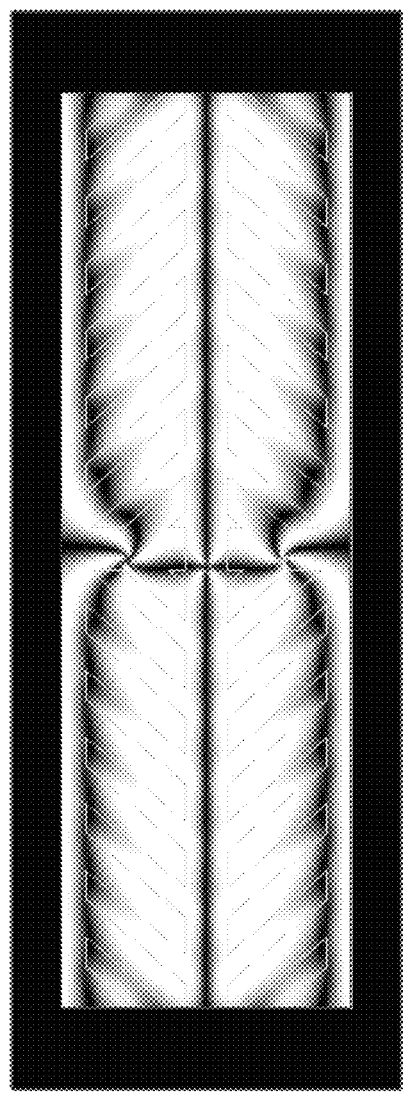
FIG. 9 is a photograph of an active area when a data voltage corresponding to a high gray level is applied to the pixel electrode of the liquid crystal display device according to a comparative embodiment.

FIG. 7 is a photograph of an active area when a data voltage is not applied to a pixel electrode of a liquid crystal display device according to a comparative embodiment, FIG. 8 is a photograph of an active area when a data voltage corresponding to a low gray level is applied to the pixel electrode of the liquid crystal display device according to the comparative embodiment, and FIG. 9 is a photograph of an active area when a data voltage corresponding to a high gray level is applied to the pixel electrode of the liquid crystal display device according to the comparative embodiment.

Here, the "liquid crystal display device according to the comparative embodiment" (not shown) has a structure substantially the same as the liquid crystal display device according to an embodiment of the invention, except that the second insulation film (173 of FIGS. 1 to 3) includes only the flat portion (173_1 of FIGS. 1 to 3, and the pixel electrode (180 of FIGS. 1 to 3) includes only the first stem electrode (181 of FIGS. 1 to 3), the second stem electrode (182 of FIGS. 1 to 3) and the branch electrode (183 of FIGS. 1 to 3). Further, FIGS. 7, 8, and 9 correspond to photographs of observing active areas (not shown). In FIG. 7, the difference in voltage level provided to a pixel electrode (not shown) and a common electrode (not shown) may be the smallest, and in FIG. 9, the difference in voltage level provided to the pixel electrode and the common electrode may be largest. Illustratively, it is assumed in FIG. 7 that the difference in voltage between the pixel electrode and the common electrode is about zero (0) V, it is assumed in FIG. 8 that the difference in voltage between the pixel electrode and the common electrode is about 3.4 V, and it is assumed in FIG. 9 that the difference in voltage between the pixel electrode and the common electrode is about 8 V.

First, referring to FIG. 7, when the data voltage is not separately applied to the pixel electrode, the active area, similarly to that of FIG. 4, may appear black.

Next, referring to FIG. 8, when the data voltage having a voltage value corresponding to a low gray level is applied to the pixel electrode, in the active area, a region in which the first stem electrode, the second stem electrode, and the branch electrode are disposed may appear bright. However, since the second insulation film (173 of FIGS. 1 to 3) and pixel electrode (180 of FIGS. 1 to 3) of the liquid crystal display device according to an embodiment of the invention, shown in FIGS. 1 to 3, do not include the first projection pattern (173_2a of FIGS. 1 to 3), the second projection pattern (173_2b of FIGS. 1 to 3), the first connection electrode (184 of FIGS. 1 to 3), the second connection electrode (185 of FIGS. 1 to 3), the first cover electrode (186 of FIGS. 1 to 3), the second cover electrode (187 of FIGS. 1 to 3), and the edge electrode (188 of FIGS. 1 to 3), it may be understood that the active area appears darker compared to the photograph of FIG. 5.

Next, referring to FIG. 9, when the data voltage having a voltage value corresponding to a high gray level is applied to the pixel electrode, it may be understood that the corresponding region of the active area appears bright. However, unlike FIG. 6 in which most of the active area appears bright, since dark portions appear along a region in which the first stem electrode and the second stem electrode are disposed, in other words, a region corresponding to the region in which the first projection pattern (173_2a of FIGS. 1 to 3) and the second projection pattern (173_2b of FIGS. 1 to 3), shown in FIGS. 1 to 3, are disposed, the active area may appear relative dark compared to the photograph of FIG. 6. That is, the transmittance of the liquid crystal display device according to the comparative embodiment may be relatively low compared to the liquid crystal display device according to an embodiment of the invention, shown in FIGS. 1 to 3. Thus, the liquid crystal display device according to an embodiment of the invention, as shown in FIGS. 1 to 3, further includes the first projection pattern (173_2a of FIGS. 1 to 3), the second projection pattern (173_2b of FIGS. 1 to 3), the first connection electrode (184 of FIGS.

1 to 3), the second connection electrode (185 of FIGS. 1 to 3), the first cover electrode (186 of FIGS. 1 to 3), the second cover electrode (187 of FIGS. 1 to 3), and the edge electrode (188 of FIGS. 1 to 3), thereby improving the transmittance thereof.

Figure 10:
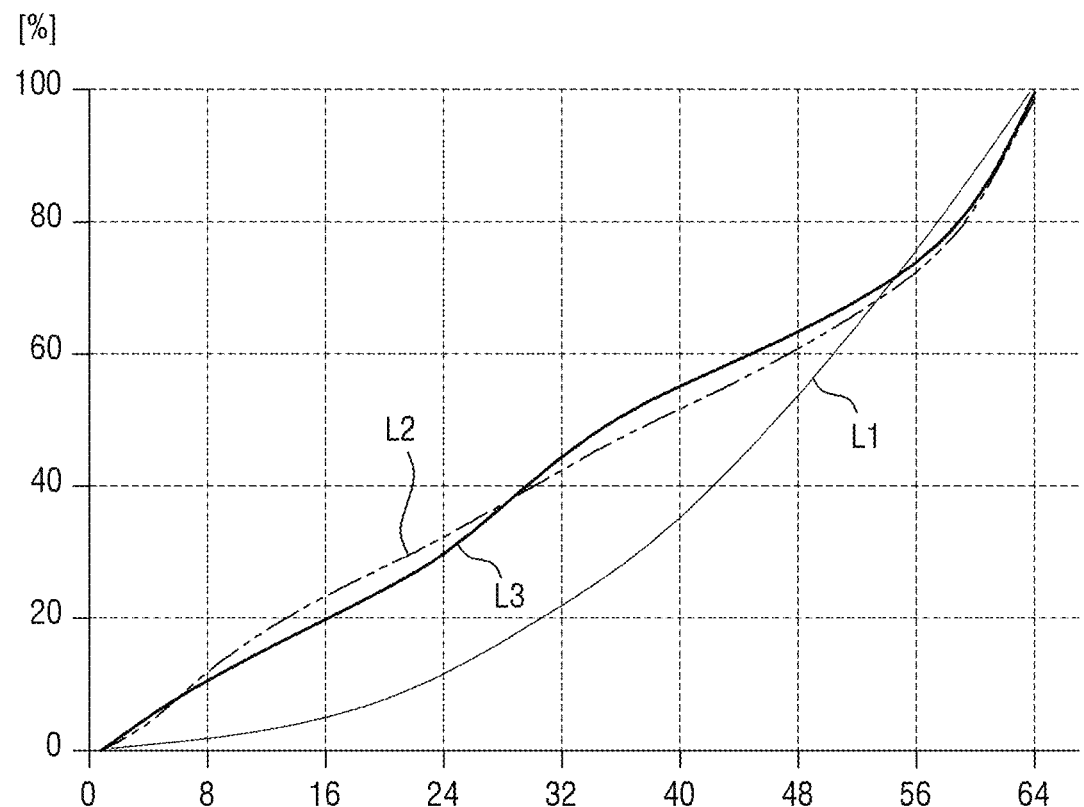
FIG. 10 is a graph showing the degree of improvement of visibility of the liquid crystal display devices according to an embodiment and a comparative embodiment.

FIG. 10 is a graph showing the degree of improvement of visibility of the liquid crystal display devices according to an embodiment and the liquid crystal display devices according to a comparative embodiment.

In the graph of FIG. 10, X axis indicates the gray level of each pixel (10 of FIG. 1), and Y axis indicates brightness (unit: %). In this graph, the criterion of the maximum value of brightness will be defined as a case of viewing a liquid crystal display device having a gray level of 63 from a front side.

Referring to FIG. 10, the first line L1 indicates the brightness according to a gray level when viewing the liquid crystal display device according to the comparative embodiment from the front side, the second line L2 indicates the brightness according to a gray level when viewing the liquid crystal display device according to the comparative embodiment from a lateral side, and the third line L3 indicates the brightness according to a gray level when viewing the liquid crystal display device according to an embodiment of the invention, shown in FIGS. 1 to 3, from the lateral side.

In the graph of FIG. 10, visibility increases as the measured value of brightness according to a gray level when viewing the liquid crystal display device from the lateral side is closer to the brightness according to a gray level when viewing the liquid crystal display device from the front side. That is, visibility is improved when any one of the second line L2 and the third line L3 is closest to the first line L1. Typically, the visibility of the liquid crystal display device is problematic at a low gray level, and the visibility thereof would be improved when the brightness according to a gray level when viewing the liquid crystal display from the lateral side, e.g., of the second line L2 and the third line L3, become closer to the first line L1 at a low gray level of 0 to 32.

In the graph of FIG. 10, the measured value closest to the first line L1 corresponds to the third line L3 in the low gray level range. Therefore, it may be understood that visibility is the better or improved under the measurement conditions according to the third line L3, that is, in the case of having a structure of the liquid crystal display device according to an embodiment of the invention, shown in FIGS. 1 to 3, and the second insulation film (173 of FIGS. 1 to 3) and pixel electrode (180 of FIGS. 1 to 3) included in this liquid crystal display device.

Figure 11:
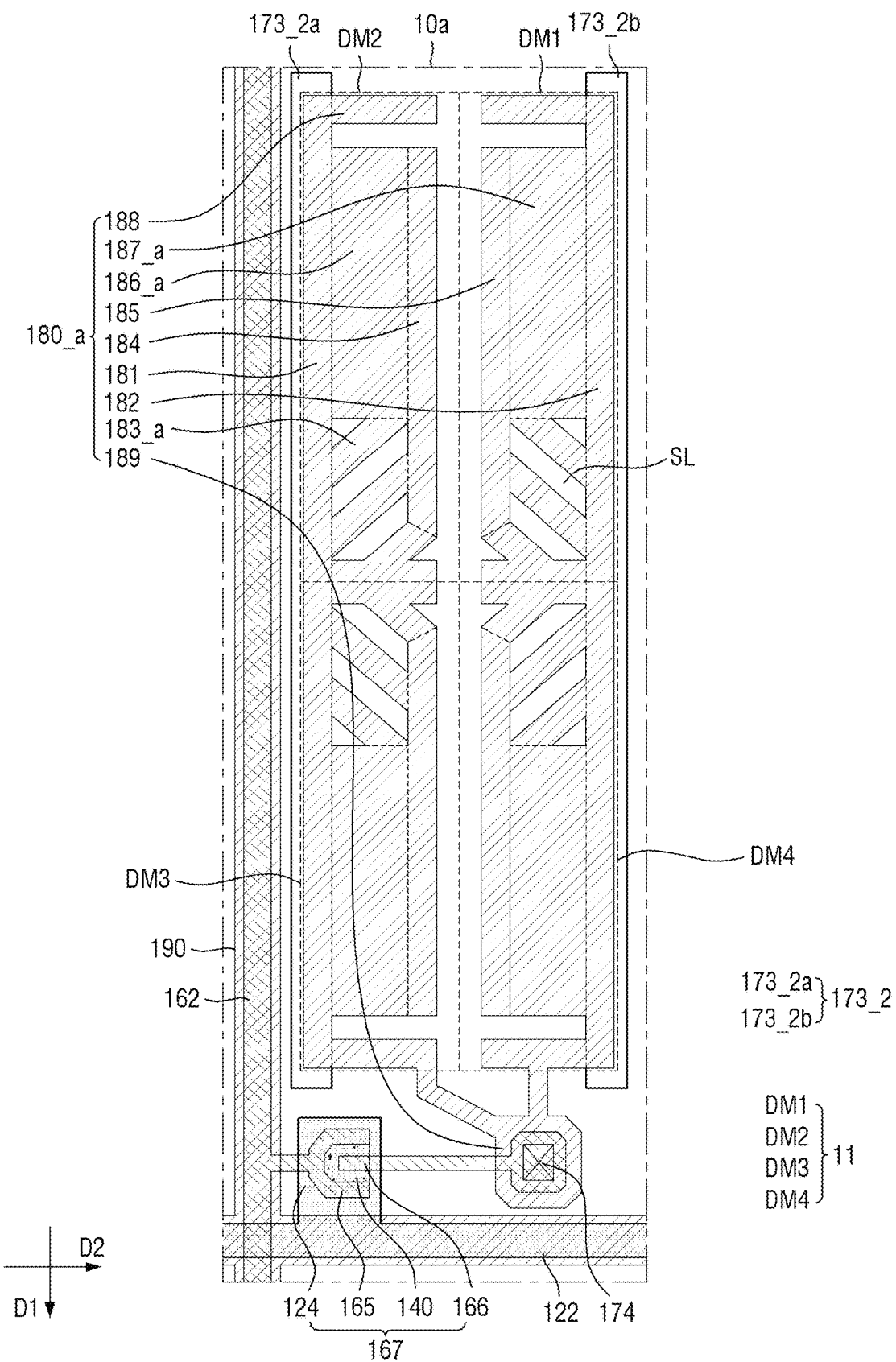
FIG. 11 is a plan view of a pixel of a liquid crystal display device according to an alternative embodiment of the invention.

FIG. 11 is a plan view of a pixel of a liquid crystal display device according to an alternative embodiment of the invention.

The pixel 10a of the liquid crystal display device shown in FIG. 11 is substantially the same as the pixel (10 of FIG. 1) of the liquid crystal display device shown in FIG. 1 except that the shapes of the branch electrode 183_a, the first cover electrode 186_a and the second cover electrode 187_a of the pixel 10a. The same or like elements shown in FIG. 11 have been labeled with the same reference characters as used above to describe the embodiments of the pixel of a liquid crystal display device shown in FIG. 1, and any repetitive detailed description thereof will hereinafter be omitted or simplified.

Referring to FIG. 11, in an alternative embodiment of the pixel electrode 180_a of the liquid crystal display device according to such an embodiment is different from the pixel electrode (180 of FIG. 1 shown in FIG. 1 in that an area occupied by the first cover electrode 186_a and the second cover electrode 187_a is enlarged, and the number of the branch electrodes 183_a is reduced. In such an embodiment, the area of the material constituting the pixel electrode 180_a in the active area further increases, and thus the effect of improving transmittance may be maximized.

Figure 12:
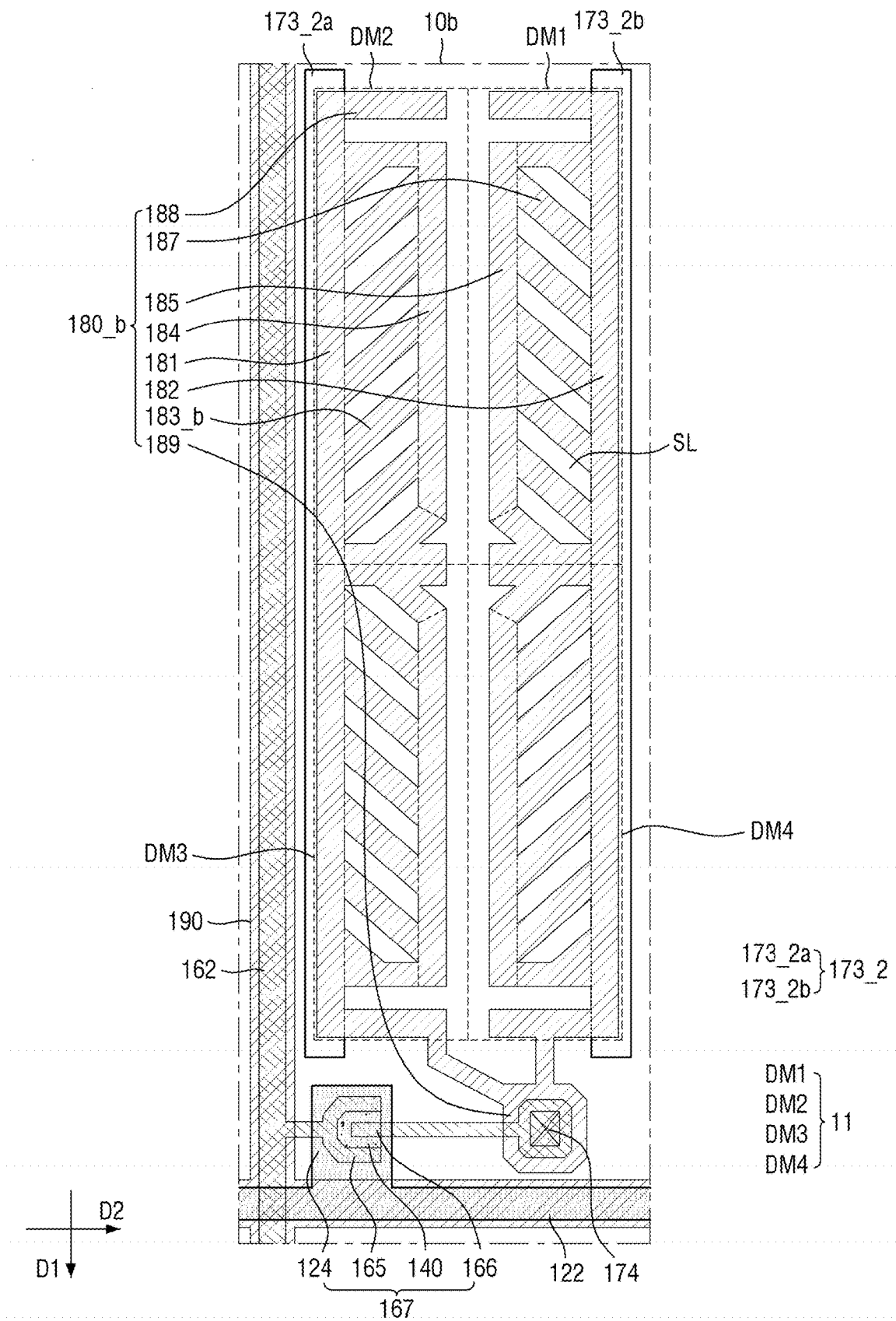
FIG. 12 is a plan view of a pixel of a liquid crystal display device according to another alternative embodiment of the invention.

FIG. 12 is a plan view of a pixel of a liquid crystal display device according to another alternative embodiment of the invention.

The pixel 10b of the liquid crystal display device shown in FIG. 12 is substantially the same as the pixel (10 of FIG. 1) of the liquid crystal display device shown in FIG. 1 except that the first cover electrode (186 of FIG. 1) and the second cover electrode (187 of FIG. 1) are omitted. The same or like elements shown in FIG. 12 have been labeled with the same reference characters as used above to describe the embodiments of the pixel of a liquid crystal display device shown in FIG. 1, and any repetitive detailed description thereof will hereinafter be omitted or simplified.

Referring to FIG. 12, the pixel electrode 180_b of the liquid crystal display device according to such an embodiment is different from the pixel electrode (180 of FIG. 1 shown in FIG. 1 in that the first cover electrode (186 of FIG. 1) and the second cover electrode (187 of FIG. 1) are omitted, and the branch electrodes 183_b are disposed instead of the first cover electrode 186 and the second cover electrode 187. In such an embodiment, the area of slits SL in the active area 11 further increases, and thus the effect of improving visibility may be maximized.

Figure 13:
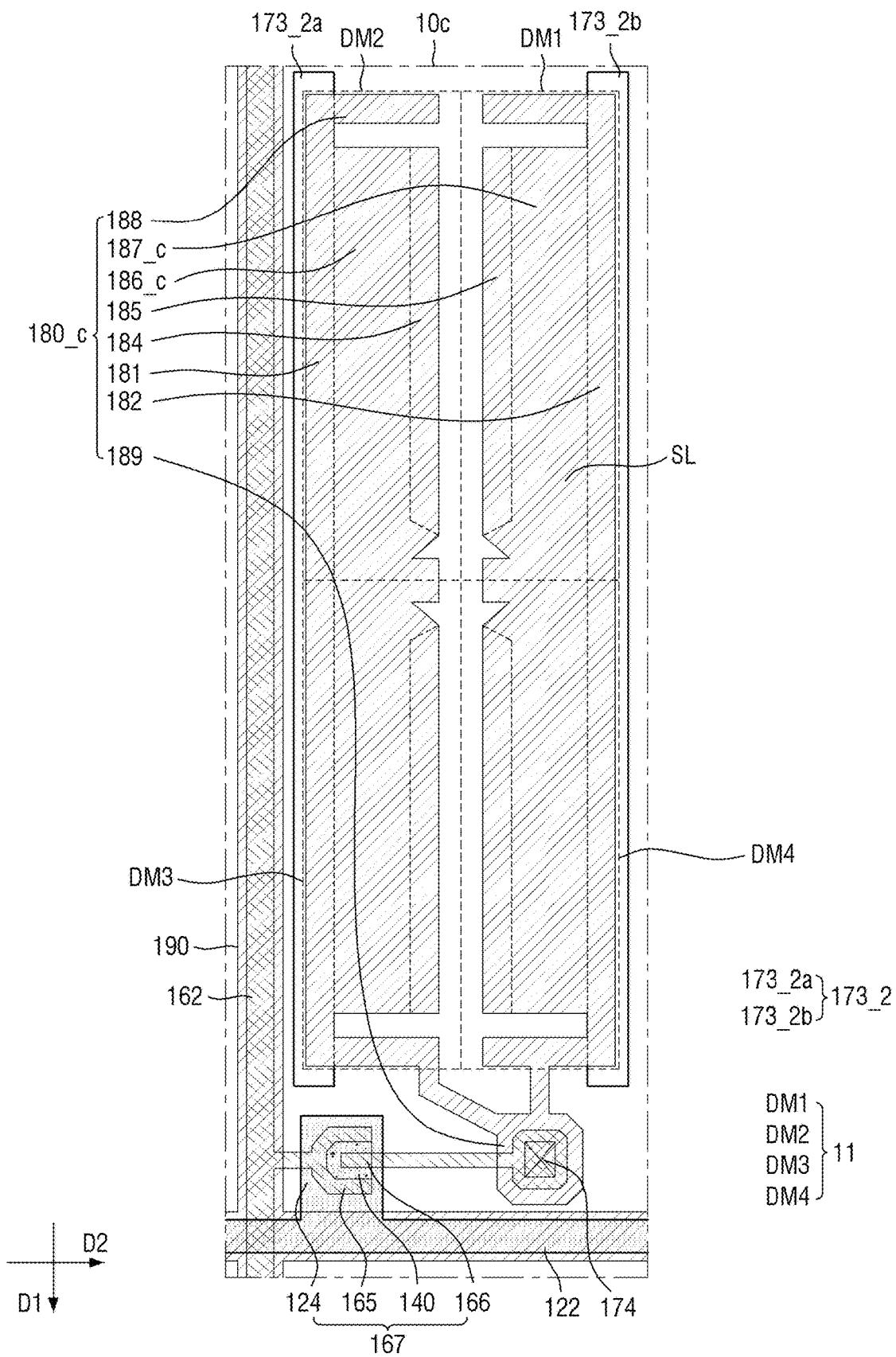
FIG. 13 is a plan view of a pixel of a liquid crystal display device according to yet another alternative embodiment of the invention.

FIG. 13 is a plan view of a pixel of a liquid crystal display device according to another alternative embodiment of the invention.

The pixel 10c of the liquid crystal display device shown in FIG. 13 is substantially the same as the pixel (10 of FIG. 1) of the liquid crystal display device shown in FIG. 1 except that the branch electrodes (183 of FIG. 1) are omitted. The same or like elements shown in FIG. 13 have been labeled with the same reference characters as used above to describe the embodiments of the pixel of a liquid crystal display device shown in FIG. 1, and any repetitive detailed description thereof will hereinafter be omitted or simplified.

Referring to FIG. 13, the pixel electrode 180_c of the liquid crystal display device according to such an embodiment is different from the pixel electrode (180 of FIG. 1) shown in FIG. 1 in that the branch electrodes (183 of FIG. 1) are omitted, and the first cover electrode 186_c and the second cover electrode 187_c are disposed instead of the branch electrodes (183 of FIG. 1). In such an embodiment, the area of the material constituting the pixel electrode 180_c in the active area 11 further increases, and thus the effect of improving transmittance may be maximized.

Figure 14:
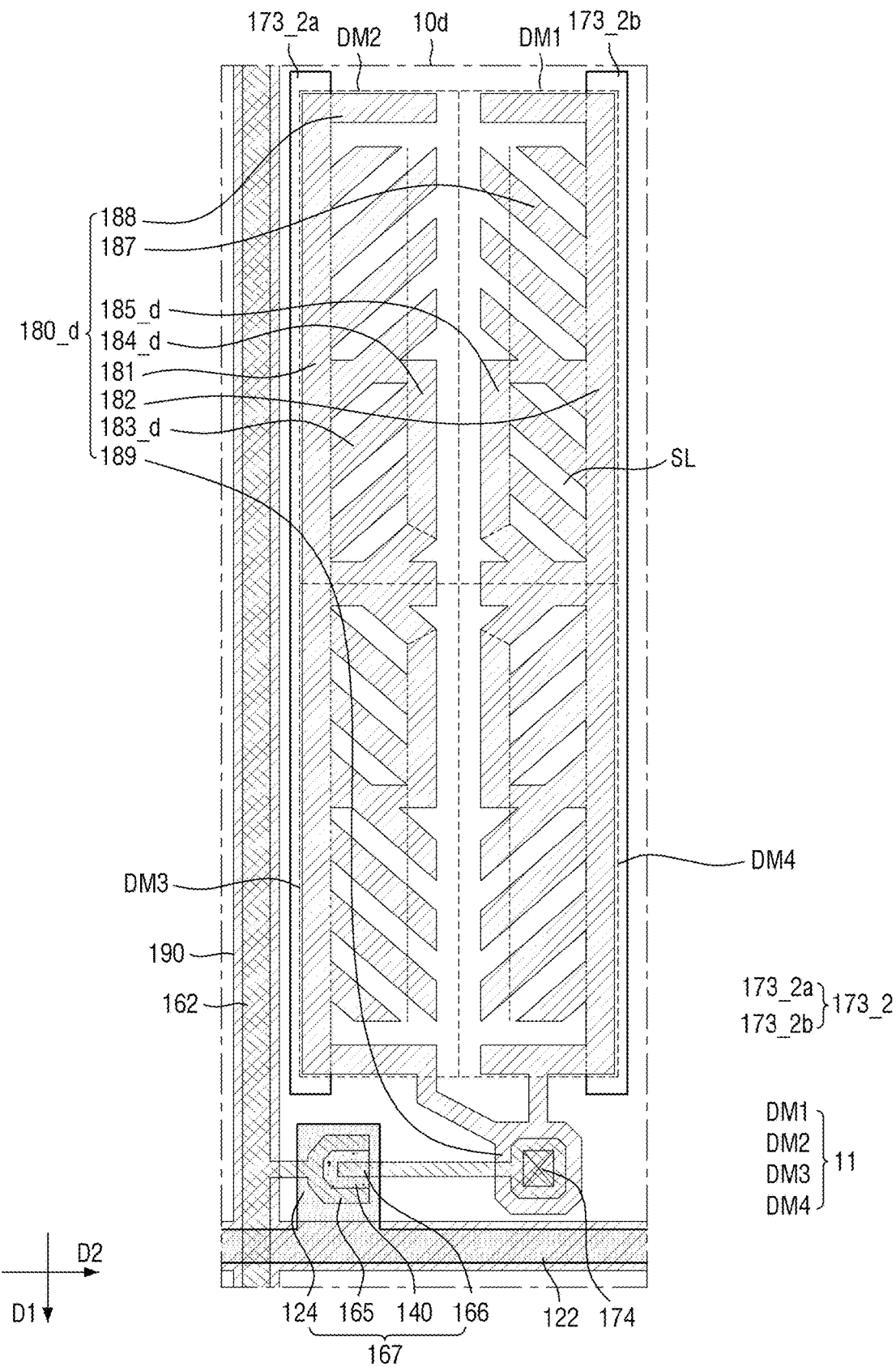
FIG. 14 is a plan view of a pixel of a liquid crystal display device according to still another alternative embodiment of the invention.

FIG. 14 is a plan view of a pixel of a liquid crystal display device according to another alternative embodiment of the invention.

The pixel 10d of the liquid crystal display device shown in FIG. 14 is substantially the same as the pixel 10b of the liquid crystal display device shown in FIG. 12 except for the shapes of the first connection electrode 184_d and the second connection electrode 185_d of the pixel 10d. The same or like elements shown in FIG. 14 have been labeled with the same reference characters as used above to describe the embodiments of the pixel of a liquid crystal display device shown in FIG. 1 or 12, and any repetitive detailed description thereof will hereinafter be omitted or simplified.

Referring to FIG. 14, the pixel electrode 180_d of the liquid crystal display device according to such an embodiment is different from the pixel electrode 180_b shown in FIG. 12 in that the first connection electrode 184_d and the second connection electrode 185_d extend relatively short. In such an embodiment, the branch electrodes 183_d are substantially the same as the branch electrodes 183_b shown in FIG. 12. In such an embodiment, in an area in which the first connection electrode 184_d and the second connection electrode 185_d are not disposed, the liquid crystal molecules 210 inclined in parallel to the second direction D2 increase, to improve visibility.

Figure 15:
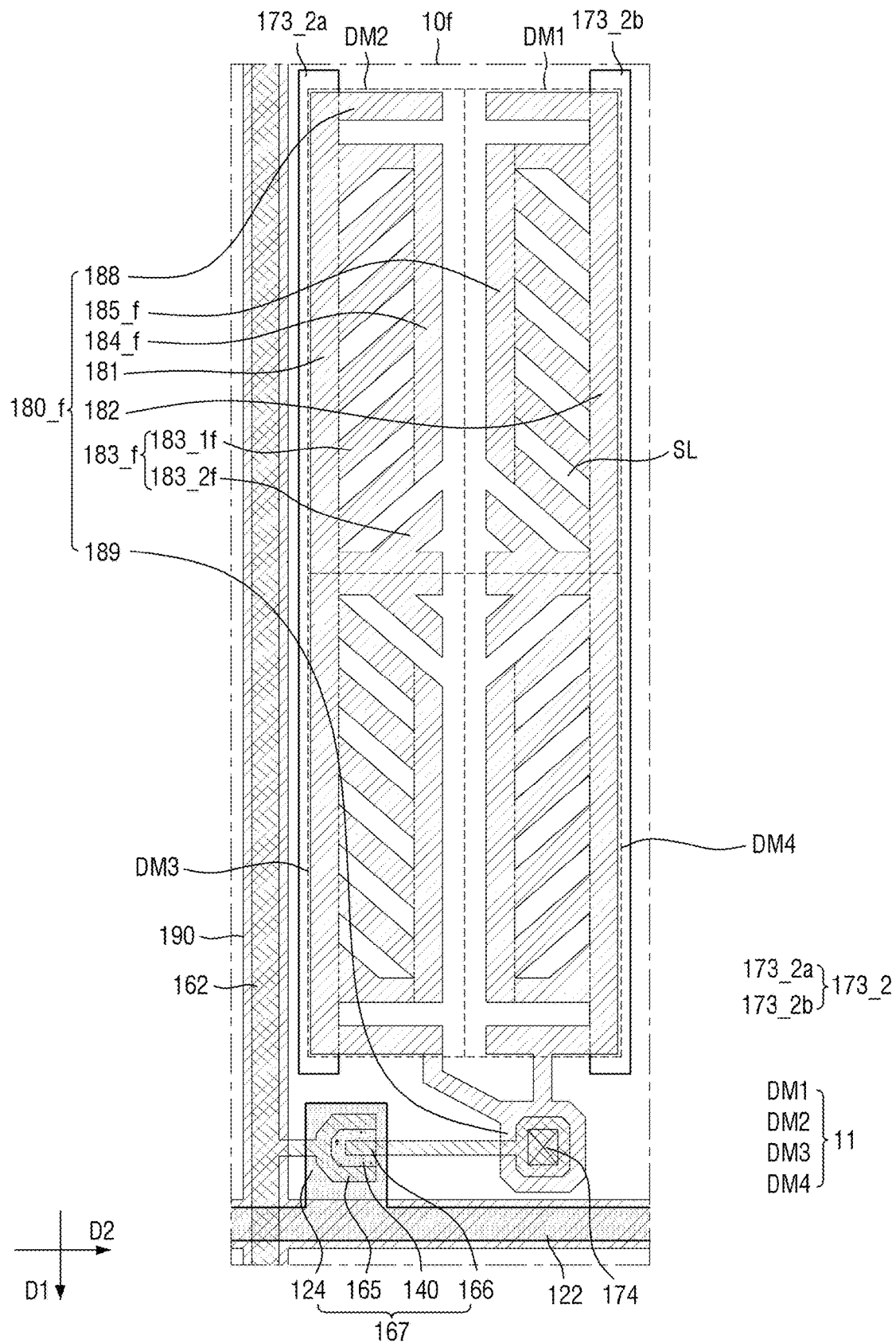
FIG. 15 is a plan view of a pixel of a liquid crystal display device according to still another alternative embodiment of the invention.

FIG. 15 is a plan view of a pixel of a liquid crystal display device according to another alternative embodiment of the invention.

The pixel 10f of the liquid crystal display device shown in FIG. 15 is substantially the same as the pixel electrode (180_b of FIG. 12) shown in FIG. 12 except that some of the branch electrodes 183_f are not connected by the first connection electrode 184_f and the second connection electrode 185_f. The same or like elements shown in FIG. 15 have been labeled with the same reference characters as used above to describe the embodiments of the pixel of a liquid crystal display device shown in FIG. 12, and any repetitive detailed description thereof will hereinafter be omitted or simplified.

Referring to FIG. 15, the pixel electrode 180_f of the liquid crystal display device according to such an embodiment may be configured in a way such that the branch electrode 183_f is divided into the first sub-branch electrode 183_1f and the second sub-branch electrode 183_2f.

Since a description of the first sub-branch electrode 183_1f is the same as that of the branch electrode (183_b of FIG. 15) shown in FIG. 12, the description of the first sub-branch electrode 183_1f will be omitted.

Each of the second sub-branch electrodes 183_2f extends from the first stem electrode 181 or the second stem electrode 182. In such an embodiment, the second sub-branch electrodes 183_2f may not be physically connected with the first connection electrode 184_f and the second connection electrode 185_f. In such an embodiment, the second sub-branch electrodes 183_2f may be electrically connected with each other through the configuration of the first stem electrode 181 or the second stem electrode 182. Therefore, each of the second sub-branch electrodes 183_2f, excluding a portion connected with the first stem electrode 181 or the second stem electrode 182, is disposed to be surrounded by the slits SL.

In such an embodiment, the second sub-branch electrodes 183_2f may extend in parallel to the second direction D2. In one embodiment, the second sub-branch electrodes 183_2f extending from the first stem electrode 181 may extend in parallel to the second direction D2 along the boundary between the second domain DM2 and the third domain DM3. Further, the second sub-branch electrodes 183_2f extending from the second stem electrode 182 may extend in parallel to the second direction D2a long the boundary between the first domain DM1 and the fourth domain DM4. However, the structure of the second sub-branch electrodes 183_2f is not limited to the structure described in this embodiment, and may be partially modified. In an embodiment, the second sub-branch electrodes 183_2f, as shown in FIG. 15, may be disposed to be slanted toward the upper end of the active area 11 or the lower end of the active area 11 such that the second sub-branch electrodes 183_2f do not extend along each of the domains while extending in parallel to the second direction D2.

In such an embodiment, since the branch electrode 183_f includes the first sub-branch electrodes 183_1f and the second sub-branch electrodes 183_2f, the force of controlling the liquid crystal molecules 210 disposed adjacent to the center of the active area 11 becomes strong, and thus transmittance may be improved.

As described above, according to embodiments of the invention, a liquid crystal display device may have improved visibility.

Further, according to embodiments of the invention, a liquid crystal display device may have improved transmittance.

The effects of the invention are not limited by the foregoing, and other various effects are anticipated herein.

In concluding the detailed description, those skilled in the art will appreciate that many variations and modifications can be made to the exemplary embodiments without substantially departing from the principles of the invention. Therefore, the disclosed exemplary embodiments of the invention are used in a generic and descriptive sense only and not for purposes of limitation.

What is claimed is:

1. A liquid crystal display device, comprising:
a substrate;
an insulation film disposed on the substrate, wherein the insulation film comprises a flat portion, and a projection pattern unit protruding from the flat portion in a direction perpendicular to the flat portion; and
a pixel electrode disposed on the substrate,
wherein the pixel electrode comprises a first stem electrode, a second stem electrode extending along a first direction and disposed to be spaced apart from the first stem electrode in a second direction perpendicular to the first direction, and a plurality of branch electrodes extending from the first stem electrode and the second stem electrode,
wherein the projection pattern unit comprises a first projection pattern extending along the first direction and partially overlapping the first stem electrode, and a second projection pattern extending along the first direction and partially overlapping the second stem electrode,
wherein the flat portion includes a first surface facing the substrate and a second surface opposite to the first surface,
wherein the projection pattern unit includes a side surface and an upper surface connected to the side surface,
wherein the side surface of the projection pattern unit and the upper surface of the projection pattern unit overlap the second surface of the flat portion in a direction perpendicular to the flat portion,
wherein the flat portion and the projection pattern unit are made of a same material as each other,
wherein the pixel electrode further comprises a first edge electrode extending from an end of the first stem electrode along the second direction and a second edge electrode extending from an end of the second stem electrode along the second direction,
wherein an edge of the first edge electrode and an edge of the second edge electrode face each other along the second direction, and
wherein the first edge electrode and the second edge electrode are spaced apart from each other along the second direction.

2. The liquid crystal display device of claim 1, wherein a width of an overlapping region of the first projection pattern and the first stem electrode in the second direction is in a range of about 1 micrometer to about 4 micrometers, and a width of an overlapping region of the second projection pattern and the second stem electrode in the second direction is in a range of about 1 micrometer to about 4 micrometers.

3. The liquid crystal display device of claim 1, wherein a width of the first projection pattern and the second projection pattern in the second direction is in a range of about 4 micrometers to about 6 micrometers.

4. The liquid crystal display device of claim 1, wherein a height of each of the first projection pattern and the second projection pattern protruding in a direction perpendicular to the substrate is in a range of about 1 micrometer to about 2 micrometers.

5. The liquid crystal display device of claim 1, wherein an angle between the substrate and a side wall of each of the first projection pattern and the second projection pattern is in a range of about 40° to about 80°.

6. The liquid crystal display device of claim 1, wherein the plurality of branch electrodes extends from the first stem electrode and the second stem electrode in a direction away from a center of a region in which the pixel electrode is disposed.

7. The liquid crystal display device of claim 6, wherein the pixel electrode further comprises:
a first connection electrode extending along the first direction and connecting ends of the branch electrodes extending from the first stem electrode; and
a second connection electrode extending along the first direction and connecting ends of the branch electrodes extending from the second stem electrode.

8. The liquid crystal display device of claim 7, wherein the branch electrode further comprises a first sub-branch electrode and a second sub-branch electrode,
an end of the first sub-branch electrode is connected with the first connection electrode or the second connection electrode, and
an end of the second sub-branch electrode is not connected with the first connection electrode or the second connection electrode.

9. The liquid crystal display device of claim 7, wherein the pixel electrode further comprises:
a first cover electrode connected between the first stem electrode and the first connection electrode and overlapping a part of a region between the first stem electrode and the first connection electrode without an opening; and
a second cover electrode connected between the second stem electrode and the second connection electrode and overlapping a part of a region between the second stem electrode and the second connection electrode without an opening.

10. The liquid crystal display device of claim 9, wherein the first stem electrode is connected with two first connection electrodes, and the branch electrodes are disposed between the first stem electrode and the two first connection electrodes; and
the second stem electrode is connected with two second connection electrodes, and the branch electrodes are disposed between the second stem electrode and the two second connection electrodes.

11. The liquid crystal display device of claim 6, wherein a region, in which the pixel electrode is disposed, is divided into four domains defined by four quadrants having a same shape as each other,
the four domains comprise a first domain disposed at a right upper side in a plan view, a second domain disposed at a left upper side in the plan view, a third domain disposed at a left lower side in the plan view, and a fourth domain disposed at a right lower side in the plan view,
the branch electrodes disposed in the first domain extend toward a right lower end,
the branch electrodes disposed in the second domain extend toward a left lower end,
the branch electrodes disposed in the third domain extend toward a left upper end, and
the branch electrodes disposed in the fourth domain extend toward a right upper end.

12. The liquid crystal display device of claim 1, wherein the first stem electrode and the second stem electrode have a same shape as each other.

13. The liquid crystal display device of claim 1, further comprising:
a gate line disposed between the substrate and the insulation film; and
a data line disposed between the substrate and the insulation film and insulated from the gate line,
wherein
the data line extends along the first direction, and
the gate line extends along the second direction.

14. A liquid crystal display device, comprising:
a substrate;
an insulation film disposed on the substrate, wherein the insulation film comprises a flat portion, and a projection pattern unit protruding from the flat portion in a direction perpendicular to the flat portion; and
a pixel electrode disposed on the substrate, divided into four quadrants having a same shape as each other, wherein the four quadrants of the pixel electrode respectively define a first domain disposed at a right upper side in a plan view, a second domain disposed at a left upper side in the plan view, a third domain disposed at a left lower side in the plan view, and a fourth domain disposed at a right lower side in the plan view,
wherein the pixel electrode comprises:
a first stem electrode disposed along left edges of the second domain and the third domain, the first stem electrode extending in a first direction;
a second stem electrode disposed along right edges of the first domain and the fourth domain, the second stem electrode extending in a first direction;
a plurality branch electrodes extending from the first stem electrode and the second stem electrode;
a first edge electrode extending from an end of the first stem electrode along a second direction intersecting the first direction; and
a second edge electrode extending from an end of the second stem electrode along the second direction, and
wherein the projection pattern unit comprises:
a first projection pattern disposed along the left edges of the second domain and the third domain and partially overlapping the first stem electrode; and
a second projection pattern disposed along the right edges of the first domain and the fourth domain and partially overlapping the second stem electrode,
wherein the flat portion includes a first surface facing the substrate and a second surface opposite to the first surface,
wherein the projection pattern unit includes a side surface and an upper surface connected to the side surface, wherein the side surface of the projection pattern unit and the upper surface of the projection pattern unit overlap the second surface of the flat portion in a direction perpendicular to the flat portion, wherein the flat portion and the projection pattern unit are made of a same material as each other, wherein an edge of the first edge electrode and an edge of the second edge electrode face each other along the second direction, and wherein the first edge electrode and the second edge electrode are spaced apart from each other along the second direction.

15. The liquid crystal display device of claim 14, wherein a width of an overlapping region of the first projection and the first stem electrode is in a range of about 1 micrometer to about 4 micrometers, and a width of an overlapping region of the second projection pattern and the second stem electrode is in a range of about 1 micrometer to about 4 micrometers.

16. The liquid crystal display device of claim 14, wherein the branch electrodes disposed in the first domain extend toward a right lower end, the branch electrodes disposed in the second domain extend toward a left lower end, the branch electrodes disposed in the third domain extend toward a left upper end, and the branch electrodes disposed in the fourth domain extend toward a right upper end.

17. The liquid crystal display device of claim 16, wherein the pixel electrode further comprises:

a first connection electrode connecting ends of the branch electrodes extending from the first stem electrode; and a second connection electrode connecting ends of the branch electrodes extending from the second stem electrode.

18. The liquid crystal display device of claim 17, wherein the pixel electrode further comprises:

a first cover electrode connected between the first stem electrode and the first connection electrode and overlapping a part of a region between the first stem electrode and the first connection electrode without an opening; and a second cover electrode connected between the second stem electrode and the second connection electrode and overlapping a part of a region between the second stem electrode and the second connection electrode without an opening.

19. A liquid crystal display device, comprising:

a substrate;

an insulation film disposed on the substrate, wherein the insulation film comprises a flat portion, and a projection pattern unit protruding from the flat portion in a direction perpendicular to the flat portion; and a pixel electrode disposed on the substrate, wherein the pixel electrode comprises a first stem electrode, a second stem electrode extending along a first direction and disposed to be spaced apart from the first stem electrode in a second direction perpendicular to the first direction, and a plurality of branch electrodes extending from the first stem electrode and the second stem electrode, wherein the projection pattern unit comprises a first projection pattern extending along the first direction and partially overlapping the first stem electrode, and a second projection pattern extending along the first direction and partially overlapping the second stem electrode, wherein the plurality of branch electrodes extends from the first stem electrode and the second stem electrode in a direction away from a center of a region in which the pixel electrode is disposed wherein the pixel electrode further comprises:

a first connection electrode extending along the first direction and connecting ends of the branch electrodes extending from the first stem electrode; and a second connection electrode extending along the first direction and connecting ends of the branch electrodes extending from the second stem electrode wherein the branch electrode further comprises a first sub-branch electrode and a second sub-branch electrode, an end of the first sub-branch electrode is connected with the first connection electrode or the second connection electrode, and an end of the second sub-branch electrode is not connected with the first connection electrode or the second connection electrode, and wherein the second sub-branch electrode extends in parallel to the second direction.

* * * * *